United States Patent
Morohoshi

(10) Patent No.: US 8,938,222 B2
(45) Date of Patent: Jan. 20, 2015

(54) EVENT NOTIFICATION DEVICE AND EVENT NOTIFICATION SYSTEM

(71) Applicant: Casio Computer Co., Ltd., Shibuya-ku, Tokyo (JP)

(72) Inventor: Hiroshi Morohoshi, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 149 days.

(21) Appl. No.: 13/796,252

(22) Filed: Mar. 12, 2013

(65) Prior Publication Data

US 2013/0244576 A1 Sep. 19, 2013

(30) Foreign Application Priority Data

Mar. 19, 2012 (JP) ................................. 2012-061699

(51) Int. Cl.
*H04W 4/02* (2009.01)
*H04B 5/04* (2006.01)
*H04B 5/00* (2006.01)

(52) U.S. Cl.
CPC ................ *H04B 5/04* (2013.01); *H04B 5/0037* (2013.01)
USPC ..................... 455/414.2; 455/41.2; 455/412.2; 455/414.1; 455/456.1

(58) Field of Classification Search
USPC ............ 455/414.2, 41.2, 412.2, 404.2, 412.1, 455/51, 518, 456.1–456.3
See application file for complete search history.

(56) References Cited

U.S. PATENT DOCUMENTS

| 8,798,593 B2* | 8/2014 | Haney | 455/414.1 |
| 8,798,645 B2* | 8/2014 | Haney | 455/456.2 |
| 8,798,647 B1* | 8/2014 | Haney | 455/456.3 |
| 8,825,086 B2* | 9/2014 | Miyake | 455/456.3 |
| 8,831,635 B2* | 9/2014 | Haney | 455/456.2 |
| 2005/0015199 A1* | 1/2005 | Lokshin et al. | 701/208 |
| 2005/0136912 A1* | 6/2005 | Curatolo et al. | 455/423 |
| 2006/0089786 A1* | 4/2006 | Soehren | 701/200 |

FOREIGN PATENT DOCUMENTS

| JP | 2009-118403 A | 5/2009 |
| JP | 2011-049801 A | 3/2011 |

* cited by examiner

*Primary Examiner* — Pablo Tran
(74) *Attorney, Agent, or Firm* — Holtz, Holtz, Goodman & Chick PC

(57) ABSTRACT

An event notification device includes a wireless communication unit, an event occurrence information acquiring unit, an enabled-notice information acquiring unit, a notice setting unit, and an event occurrence notification unit. The wireless communication unit transmits and receives information on an online service from multiple external devices. The event occurrence information acquiring unit acquires an event occurrence notice via the wireless communication unit from the external devices. The enabled-notice information acquiring unit acquires enabled-notice information on the event occurrence notice via the wireless communication unit. The notice setting unit requests one external device to transmit the event occurrence notice and requests the other external devices not to transmit the event occurrence notice if the multiple external devices can individually transmit the same event occurrence notice. The event occurrence notification unit notifies a user of the event occurrence on the basis of the event occurrence notice.

14 Claims, 17 Drawing Sheets

| DEVICE ID | SERVICE ID | NOTICE SETTING |
|---|---|---|
| ID 1001 | ID 2001 | ON |
| ID 1001 | ID 2002 | ON |
| ID 1002 | ID 2001 | OFF |
| ID 1002 | ID 2003 | ON |
| ID 1001 | ID 2004 | ON |
| ID 1003 | ID 2001 | OFF |
| ID 1003 | ID 2003 | OFF |

FIG.14A

| PRIORITY | DEVICE ID |
|---|---|
| 2 | ID 1001 |
| 3 | ID 1002 |
| 4 | ID 1003 |
| 1 | ID 1004 |
| 5 | ID 1005 |

FIG.14B

| SERVICE ID = ID 2001 | |
|---|---|
| PRIORITY | DEVICE ID |
| 2 | ID 1001 |
| 3 | ID 1002 |
| 4 | ID 1003 |
| 1 | ID 1004 |
| 5 | ID 1005 |

| SERVICE ID = ID 2002 | |
|---|---|
| PRIORITY | DEVICE ID |
| 3 | ID 1001 |
| 2 | ID 1002 |
| 4 | ID 1003 |
| 1 | ID 1004 |

. . .

EVENT NOTIFICATION DEVICE AND EVENT NOTIFICATION SYSTEM

BACKGROUND OF THE INVENTION

1. Field of the Invention

The present invention relates to an event notification device and an event notification system which make notification of wirelessly obtained information on the occurrence of an event associated with a network service.

2. Description of Related Art

Electronic devices have been used that can transmit and receive various types of information by near field wireless communication schemes such as Bluetooth (registered trademark).

The near field wireless communications facilitate the sharing of information individually obtained and held by multiple electronic devices, especially of mobile types, with other electronic devices.

For example, Japanese Patent Laid-Open Publication No. 2009-118403 discloses a technique that allows a mobile phone to acquire time information from an electronic wristwatch using a Bluetooth module included therein to modify the time of the electronic wristwatch.

Japanese Patent Laid-Open Publication No. 2011-049801 discloses a technique that allows a mobile phone and a smartphone to wirelessly transfer information on an incoming call or message to an electronic wristwatch and allows the electronic wristwatch to notify a user of such a call and message and to display the number of unread or unopened messages.

Such a technique enables prompt notification to a user of an incoming message via an electronic wristwatch on a wrist of the user even if a mobile phone is in a bag, for example.

Electronic devices such as PCs and smartphones used through a network (i.e., the Internet) have conventionally utilized services for the notice of event occurrence such as incoming emails and posts on web sites through various servers on the Internet.

A near field wireless communication unit such as Bluetooth can further transfer a notice from such a notice service to an electronic device close to or carried by a user, thereby allowing the user to promptly access the notice.

Unfortunately, an increasing number of such electronic devices having the functions of network communications and near field wireless communications may cause duplicate delivery of the same event notice from a plurality of electronic devices such as PCs, mobile phones, and smartphones to one electronic device.

Moreover, switching of notice delivery settings is troublesome to the user and causes failed acquisition of a notice if all the settings are accidentally turned off.

SUMMARY OF THE INVENTION

It is, therefore, a main object of the present invention to provide an event notification device and an event notification system which are capable of properly controlling the transmission and reception of information among a plurality of external devices which is capable of wirelessly transmitting the same information.

According to a first aspect of the present invention, there is provided an event notification device including:

a wireless communication unit which wirelessly transmits and receives predetermined information on an online service using a communication network over a period of maintaining communications with a plurality of external devices which can use the online service via the communication network;

an event occurrence information acquiring unit which acquires an event occurrence notice via the wireless communication unit from each of the external devices maintaining the communications, the event occurrence notice indicating the occurrence of a predetermined event of the online service being used by the external devices;

an enabled-notice information acquiring unit which acquires an enabled-notice information item on the event occurrence notice via the wireless communication unit, the event occurrence notice being transmittable from each of the external devices maintaining the communications;

a notice setting unit which requests one of the external devices to transmit the event occurrence notice and requests the other external devices not to transmit the event occurrence notice if the enabled-notice information items indicate that the external devices are capable of individually transmitting the same event occurrence notice; and an event occurrence notification unit which notifies a user of the occurrence of the predetermined event by a predetermined operation on the basis of the event occurrence notice acquired by the event occurrence information acquiring unit from the external device requested by the notice setting unit to transmit the event occurrence notice.

According to a second aspect of the present invention, there is provided an event notification system which including an event notification device including:

a wireless communication unit which wirelessly transmits and receives predetermined information on an online service using a communication network over a period of maintaining communications with a plurality of external devices which can use the online service via the communication network;

an event occurrence information acquiring unit which acquires an event occurrence notice via the wireless communication unit from each of the external devices maintaining the communications, the notice indicating the occurrence of a predetermined event of the online service being used by the external devices;

an enabled-notice information acquiring unit which acquires an enabled-notice information item on the event occurrence notice via the wireless communication unit, the event occurrence notice being transmittable from each of the external devices maintaining the communications;

a notice setting unit which requests one of the external devices to transmit the event occurrence notice and requests the other external devices not to transmit the event occurrence notice if the enabled-notice information items indicate that the external devices are capable of individually transmitting the same event occurrence notice; and an event occurrence notification unit which notifies a user of the occurrence of the predetermined event by a predetermined operation on the basis of the event occurrence notice acquired by the event occurrence information acquiring unit from the external device requested by the notice setting unit to transmit the event occurrence notice; and the external devices, wherein each of the external devices includes:
an event occurrence detection unit which detects and outputs a predetermined event occurred in the online service;
an event occurrence notice unit which wirelessly transmits the event occurrence notice to the event notification device on the basis of the output from the event occurrence detection unit;
an enabled-notice information transmission control unit which wirelessly transmits the enabled-notice information item to the event notification device maintaining the communications; and a notice control unit which controls the transmission of the event occurrence notice by the event occurrence notice unit on the basis of the allowance requested by the event notification device to transmit the event occurrence notice.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 14A and 14B illustrate examples of priority setting tables;

DETAILED DESCRIPTION OF THE PREFERRED EMBODIMENTS

Embodiments of the present invention will now be described with reference to the accompanying drawings.

Figure 1:
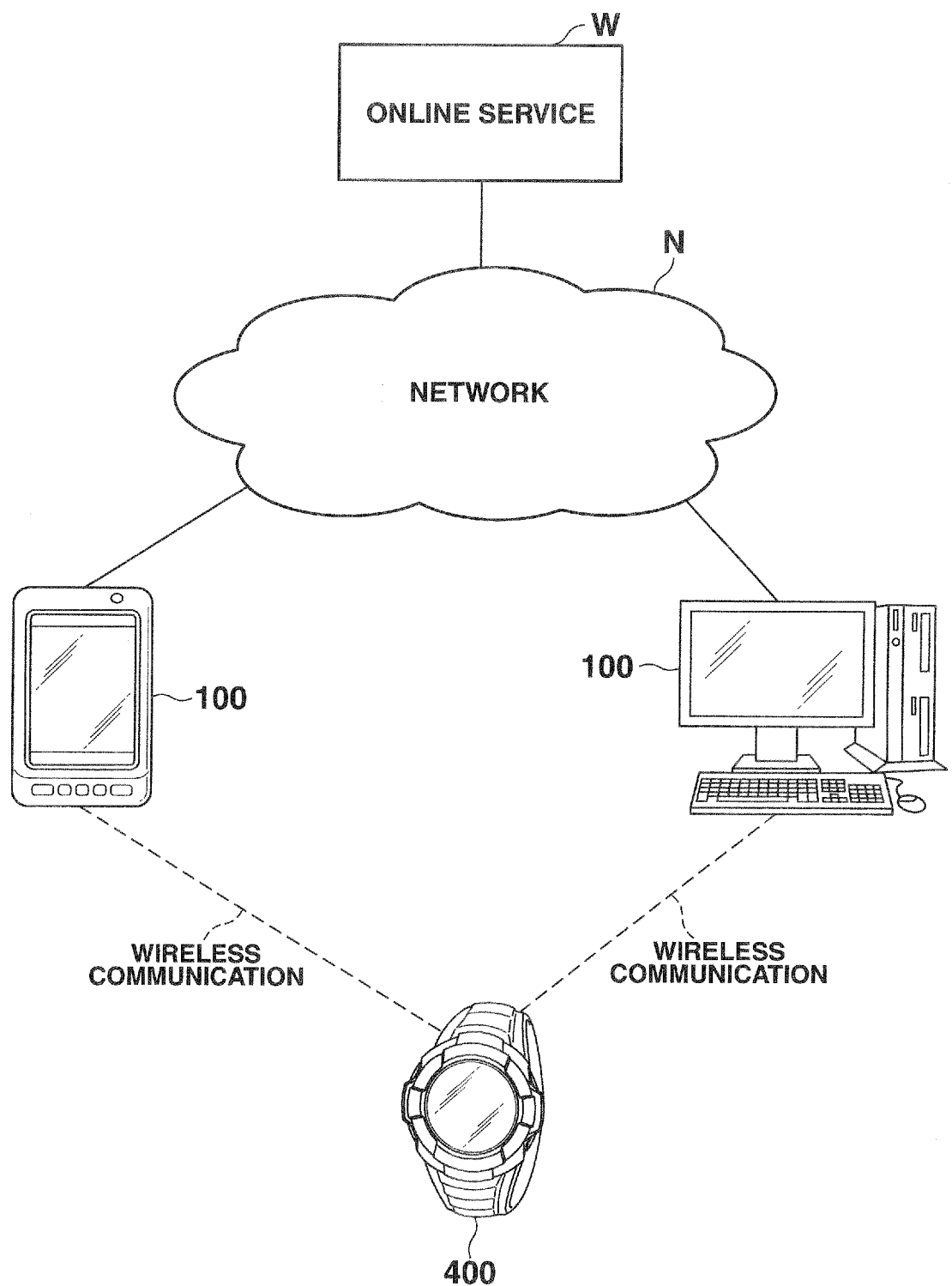
FIG. 1 illustrates the entire configuration of an event notification system according to an embodiment of the present invention.

FIG. 1 illustrates the entire configuration of an event notification system according to an embodiment of the present invention.

The event notification system 1 of the present embodiment includes an electronic wristwatch 400 that is an event notification device and a plurality of external devices 100 that can simultaneously communicate with the electronic wristwatch 400.

The electronic wristwatch 400 includes the main body of a wristwatch and a band and can be worn on a wrist.

For example, the external devices 100 may be each a smartphone or a notebook computer, but are not limited thereto.

The electronic wristwatch 400 and the external devices 100 each have a function of near field wireless communications and can communicate with each other by Bluetooth, for example.

The external devices 100 are each connected to a network service W (online service) such as a mail or web server via a network N such as the Internet.

[First Embodiment]

Figure 2:
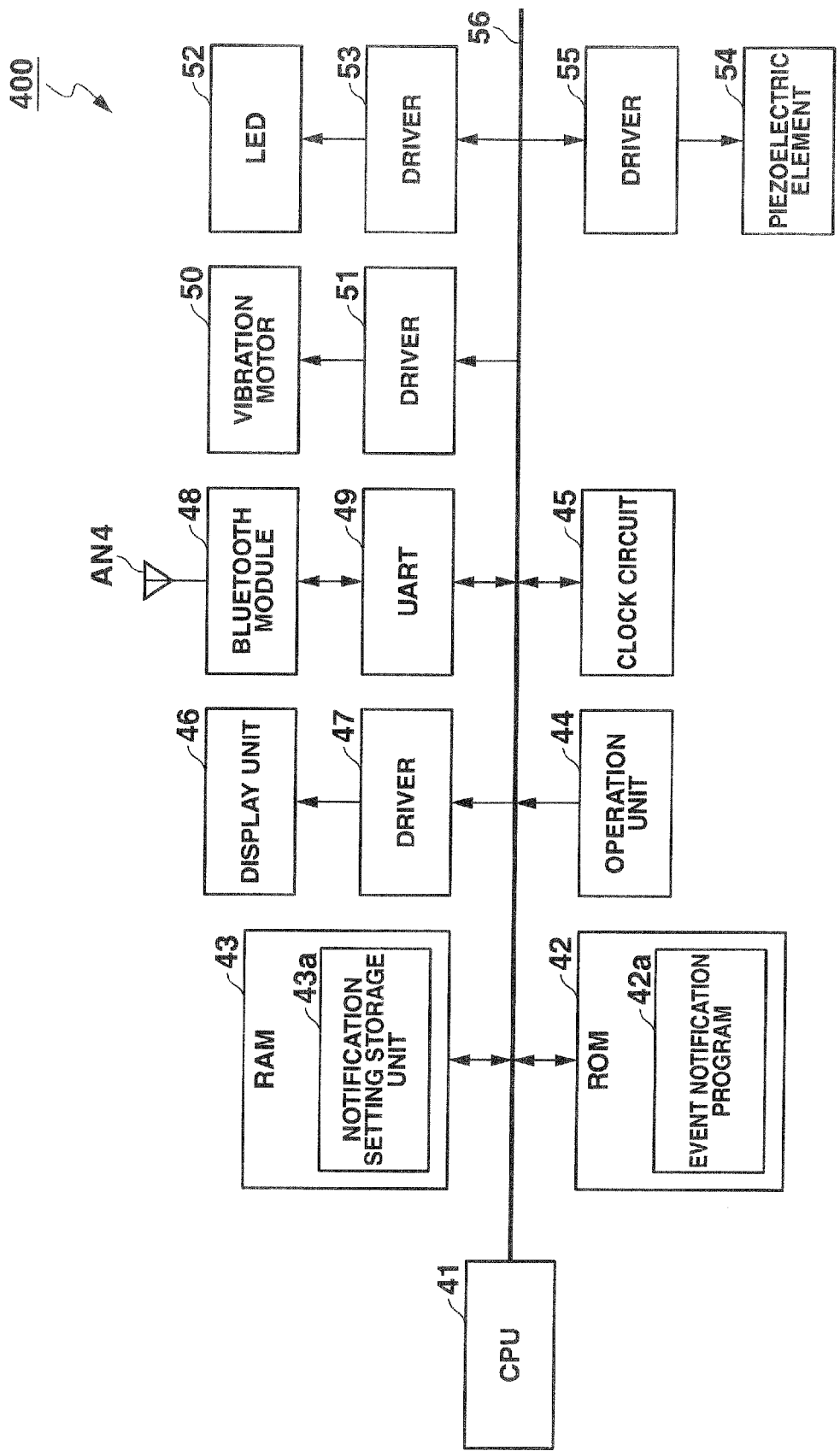
FIG. 2 is a block diagram illustrating the internal configuration of an electronic wristwatch that is an embodiment of an event notification device.

FIG. 2 is a block diagram illustrating the internal configuration of the electronic wristwatch 400 according to an embodiment of the present invention.

Figure 3:
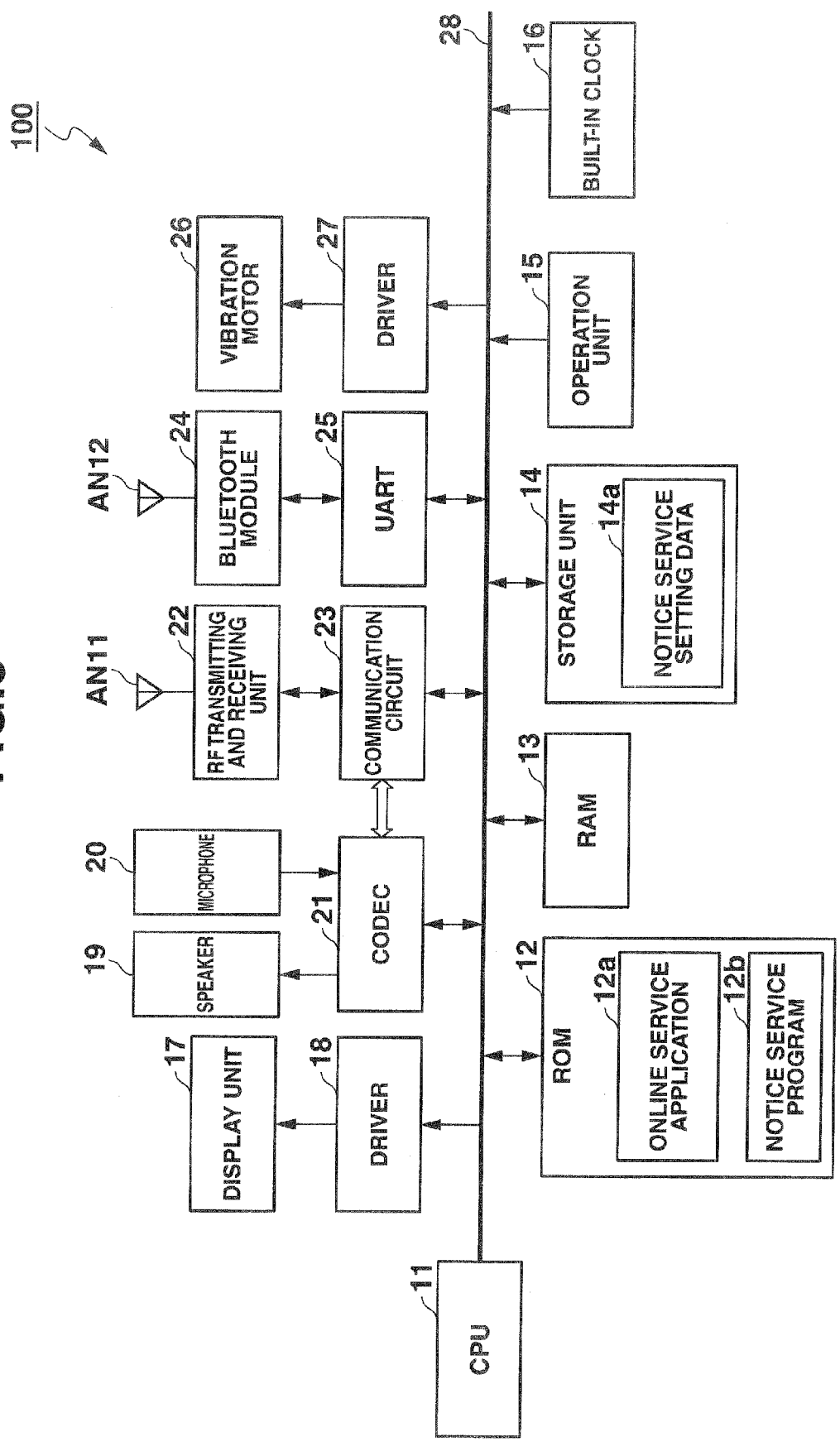
FIG. 3 is a block diagram illustrating the internal configuration of a smartphone that is an embodiment of an external device.

FIG. 3 is a block diagram illustrating the internal configuration of one of the external devices 100 according to the embodiment of the present invention.

The electronic wristwatch 400 illustrated in FIG. 2 includes a central processing unit (CPU) 41 (i.e., an event occurrence information acquiring unit, a notice setting unit, a notice source determining unit, a notice setting transmission control unit, a enabled-notice information acquiring unit, and a list updating unit), read only memory (ROM) 42, random access memory (RAM) 43, an operation unit 44, a clock circuit 45, a display unit 46, a display driver 47, a Bluetooth module 48 that is a wireless communication unit, a universal asynchronous receiver transmitter (UART) 49, a vibration motor 50, a vibration motor driver 51, a light emitting diode (LED) 52, an LED driver 53, a piezoelectric element 54, a piezoelectric element driver 55, and a bus 56 through which the CPU 41 and the above respective components transmit and receive signals to and from each other.

The CPU 41 controls the overall operation of the electronic wristwatch 400 and performs various arithmetic processes.

The CPU 41 displays a current time counted by the clock circuit 45 on the display unit 46.

The CPU 41 also makes notification associated with event occurrence by displaying the occurrence of the event on the display unit 46 or operating the vibration motor 50, the piezoelectric element 54, and/or the LED 52 in response to an event occurrence notice received from any one of the external devices 100 via the Bluetooth module 48.

The notification associated with event occurrence will be described in detail later.

The ROM 42 stores a variety of programs executed by the CPU 41 and default setting data therein.

Data stored in the ROM 42 includes an event notification program 42a.

The event notification program 42a executed by the CPU 41 turns on and off a notice of event occurrence information that can be sent by the external devices 100.

The RAM 43 provides the CPU 41 with working memory space.

The RAM 43 also includes a notification setting storage unit 43a (noticed-event storage unit), and stores a list of event occurrence information currently receivable from the external device 100 and the setting of an external device from which the electronic wristwatch 400 actually receives event occurrence information.

The operation unit 44 includes one or more operation keys and switches. The operation unit 44 generates an electrical signal in response to user operation on these keys and switches and outputs the signal to a CPU 11 as an input signal.

The operation unit 44 may also be any other input unit such as a touch panel.

The clock circuit 45 is a counter that counts and holds a current time.

The electronic wristwatch 400 displays the current time read out from the clock circuit 45 on the display unit 46.

The display unit 46 is a liquid crystal display (LCD), for example. The driver 47 (LCD driver), which operates in response to a control signal from the CPU 41, drives the LCD to display a designated item such as a current time, settings of functions, and a setting menu.

The display unit 46 may also be any other displaying unit such as an organic electro-luminescent display (ELD), and the driver 47 may be selected depending on the type of the display unit 46.

The display unit 46 can display dot-matrix characters and figures of a date and a time.

The display unit 46 may also display a sign related to the notification of event occurrence such as a symbol or a figure, which are predetermined, indicating an event, for example, a mark indicating email arrival.

The Bluetooth module 48 is a control module for carrying out the Bluetooth communications with the external devices 100 via an antenna AN4.

Transmission data output from the CPU 41 is serial- or parallel-converted by the UART 49 and transmitted from the Bluetooth module 48 to the external device 100.

Reception data from any one of the external devices 100 via the Bluetooth module 48 is serial- or parallel-converted by the UART 49 and transferred to the CPU 41.

The vibration motor 50, the light emitting diode (LED) 52, and the piezoelectric element (PZT) 54 make notification to the user by vibrations, light, and buzzer sound, respectively.

The drivers 51, 53, and 55, which receive control signals from the CPU 41, convert the signals into voltage signals for operating the vibration motor 50, the LED 52, and the piezoelectric element 54, respectively, and output the resultant signals.

The vibration motor 50, the LED 52, the piezoelectric element 54, and the display unit 46 configure an event occurrence notification unit.

A smartphone will now be described as one example of the external devices 100.

The external device 100 illustrated in FIG. 3 includes the CPU 11 (i.e., an event occurrence detection unit, an event occurrence notice unit, a notice control unit, and a enabled-notice information transmission control unit), ROM 12, RAM 13, a storage unit 14, an operation unit 15 that is an input unit, a built-in clock 16, a display unit 17, a display driver 18, a speaker 19, a microphone 20, a codec 21, an RF transmitting and receiving circuit 22, an antenna AN11 for RF communications, a communication circuit 23, a Bluetooth module 24, a UART 25, an antenna AN12 for Bluetooth communications, a vibration motor 26, a vibration motor driver 27, and a bus 28 through which the CPU 11 and the above respective components are connected to each other.

The CPU 11 controls the overall operation of the external device 100 and performs various arithmetic processes.

The CPU 11 also transmits a control signal to the Bluetooth module 24 on the basis of notice service setting data 14a described later to send a notice associated with occurrence of a predetermined event to the electronic wristwatch 400.

The RAM 13 provides the CPU 11 with working memory space and stores temporary data therein.

The ROM 12 stores a variety of programs executed by the CPU 11 and default data therein.

The programs include a variety of online service applications 12a and a notice service program 12b.

The online service applications 12a are a variety of application programs used via a network such as the Internet.

Examples of the online service applications 12a include a program of detecting email arrival at a predetermined mail server and a program of detecting various types of data input and update through a predetermined web server.

The notice service program 12b is a control and executive program of transmitting a control signal to the Bluetooth module 24 in response to occurrence of a predetermined event associated with each of the online service applications 12a, thereby causing an external device (here, the electronic wristwatch 400) to send a notice associated with the event occurrence.

Figures 4, 5:
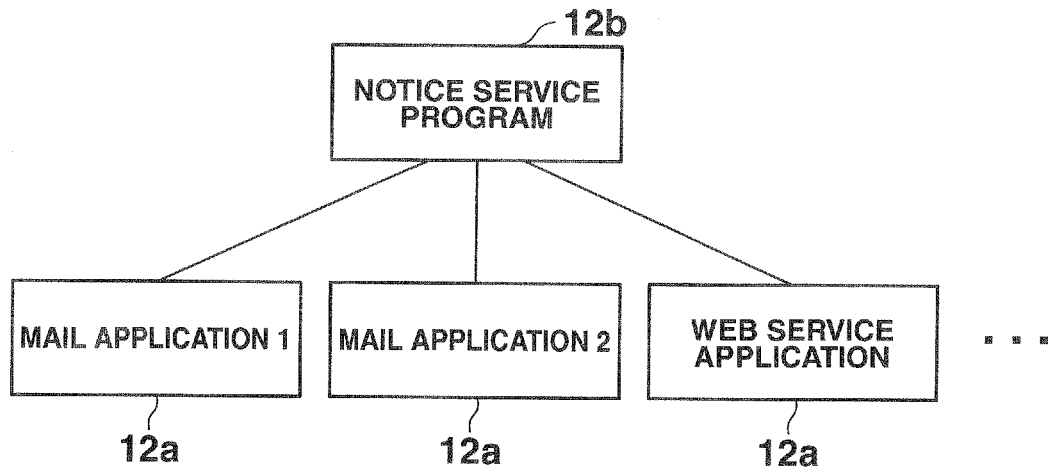
FIG. 4 illustrates programs stored in an external device.
FIG. 5 illustrates a memory configuration of a table stored in a notification setting storage unit.

FIG. 4 illustrates programs stored in the external device 100.

The notice service program 12b is called at the start-up of the external device 100 and resides during the operation of the external device 100.

The notice service program 12b may also reside while Bluetooth connection is established between the external device 100 and another electronic device (here, the electronic wristwatch 400).

The notice service program 12b is installed in each of the external devices 100.

The notice service program 12b is connected to each of the online service applications 12a to detect occurrence of an event associated with each online service application 12a, and sends a notice of the event occurrence information to an external device (the electronic wristwatch 400) if the notice is enabled.

The storage unit 14 is readable and writable nonvolatile memory such as flash memory and electrically erasable and programmable read only memory (EEPROM).

The storage unit 14 includes the notice service setting data 14a (enabled-notice information).

The notice service setting data 14a includes setting data indicating whether the notice service program 12b sends a notice to an external device (the electronic wristwatch 400) at occurrence of an event associated with any one of the online service applications 12a.

The operation unit 15 includes multiple operation keys and switches. The operation unit 15 generates an electrical signal in response to the user operation on these keys and switches and outputs the signal to the CPU 11 as an input signal.

The operation unit 15 may also include a touch panel and a detecting unit for an input on the touch panel.

The built-in clock 16 is a counter that counts and holds a current time.

The external device 100 displays the read-out current time on the display unit 17.

A variety of operations may be performed based on the comparison of set time data of respective functions with the current time data.

The current time data on the built-in clock 16 is modified by time data obtained from a mobile base station each time the RF transmitting and receiving circuit 22 communicates with the mobile base station.

The display unit 17 is a liquid crystal display (LCD), for example.

The driver 18 (LCD driver), which operates in response to a control signal from the CPU 11, drives the LCD to display an item related to each function of the external device 100.

The display unit 17 may also be any other displaying unit such as an organic electro-luminescent display (ELD), and the driver 18 may be selected depending on the type of the displaying unit.

The speaker 19 converts electrical signals from the codec 21 into sound signals to output sound.

The microphone 20 converts the detected sound wave into electrical signals and outputs the resultant signals to the codec 21.

The codec 21 decodes compression-coded digital sound signals and sends the resultant analog signals to the speaker 19. The codec 21 also encodes sound signals from the microphone 20 and outputs the resultant signals to the CPU 11 and the communication circuit 23.

Note that a speaker used during a call may also be separated from a speaker for outputting sound.

The RF transmitting and receiving circuit 22 transmits and receives telephone communication data and email communication data to and from a mobile base station via the antenna AN11 for RF communications.

The communication circuit 23 also processes the transmission and reception data to and from the RF transmitting and receiving circuit 22 and passes the data between the CPU 11 and the codec 21.

The Bluetooth module 24 is a control module for carrying out Bluetooth communications with an electronic device such as the electronic wristwatch 400 via the antenna AN12.

Transmission data from the CPU 11 is serial- or parallel-converted by the UART 25 and transmitted from the Bluetooth module 24 to an electronic device.

Reception data from an electronic device via the Bluetooth module 24 is serial- or parallel-converted by the UART 25 and transferred to the CPU 11.

The vibration motor 26 performs notification to a user by vibrations.

The driver 27 converts a control signal from the CPU 41 into a voltage signal to operate the vibration motor 26 and outputs the resultant signal.

FIG. 5 is a table illustrating the contents of the notification setting storage unit 43a in the electronic wristwatch 400.

The notification setting storage unit 43a stores the table of service IDs (event identification information) and device IDs (device identification information) in association with each other, where the service IDs relate to the types of events received by the electronic wristwatch 400 from any one of the external devices 100, and device IDs each identify the external devices 100.

A service that is running in an external device 100 having a device ID at the time of the establishment of Bluetooth communications with the external device 100 or a service that is started up in an external device 100 with its Bluetooth communications established is sequentially registered as a record (event notice information) of the table.

A registered record is deleted each time Bluetooth communications are interrupted or a service is stopped in an external device 100 with its Bluetooth communications established.

The service IDs are determined by the notice service program 12b in a predetermined pattern so as to assign the same service ID to one service.

That is, the same service ID is given to one service used in different external devices 100.

In the case where the same service program is associated with different users, such as the case where one mail server delivers emails over multiple accounts, individual service IDs are determined.

Each record also has a notice setting (notice setting information) indicating whether to send a notice of event occurrence to a corresponding external device.

Each time a new notice is set and registered or the current notice is changed, the notice is transmitted to a corresponding external device 100 which then determines whether to send a notice of event occurrence.

The operations of the electronic wristwatch 400 and the external devices 100 in the event notification system of the present embodiment will now be described.

Figure 6:
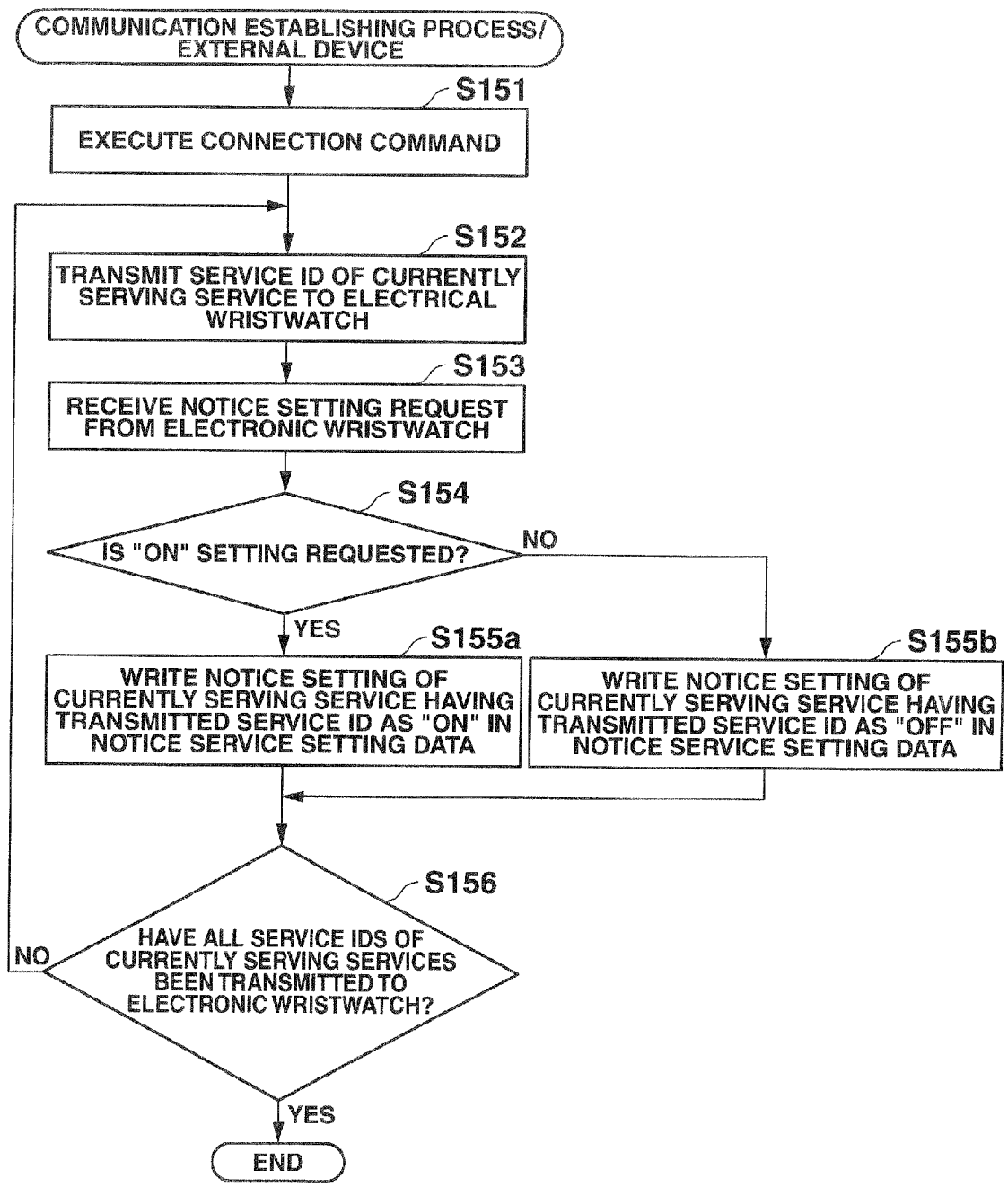
FIG. 6 is a flow chart illustrating a control process for establishing communications of an external device.

FIG. 6 is a flow chart illustrating a control process for establishing the Bluetooth communications between the external device 100 and the electronic wristwatch 400, the process being controlled by the CPU 11.

The CPU 11 starts the process with establishing the communications and executing connection commands to carry out various initial settings (Step S151).

Upon the establishment of the communications with the electronic wristwatch 400, the CPU 11 operates on the basis of the notice service program 12b.

The CPU 11 acquires service IDs of online services currently serving to the external device 100 through the online service applications 12a from the notice service setting data 14a. The CPU 11 then transmits the service IDs to the electronic wristwatch 400 in sequence (Step S152).

The CPU 11 then waits, from the electronic wristwatch 400, a setting request about whether to send notices of event occurrence associated with the services of the service IDs to the electronic wristwatch 400, and receives the setting request (Step S153).

Upon the reception of the setting request from the electronic wristwatch 400, the CPU 11 determines whether the request represents "ON", namely, an event occurrence notice is requested (Step S154).

If the CPU 11 determines the "ON" request, the CPU 11 writes "ON" in the notice service setting data 14a (Step S155a), and carries out Step S156. If the CPU 11 determines the "OFF" request, i.e., determines an event occurrence notice is not requested, the CPU 11 writes "OFF" in the notice service setting data 14a (Step S155b), and carries out Step S156.

In Step S156, the CPU 11 determines whether all the service IDs of services serving to the external device 100 and set in the notice service setting data 14a are transmitted to the electronic wristwatch 400.

If all the service IDs have not been transmitted, the CPU 11 carries out Step S152 to transmit a remaining service ID to the electronic wristwatch 400 via the Bluetooth module 24. If all the service IDs have been transmitted, the CPU 11 finishes the process for establishing the communications.

Figure 7:
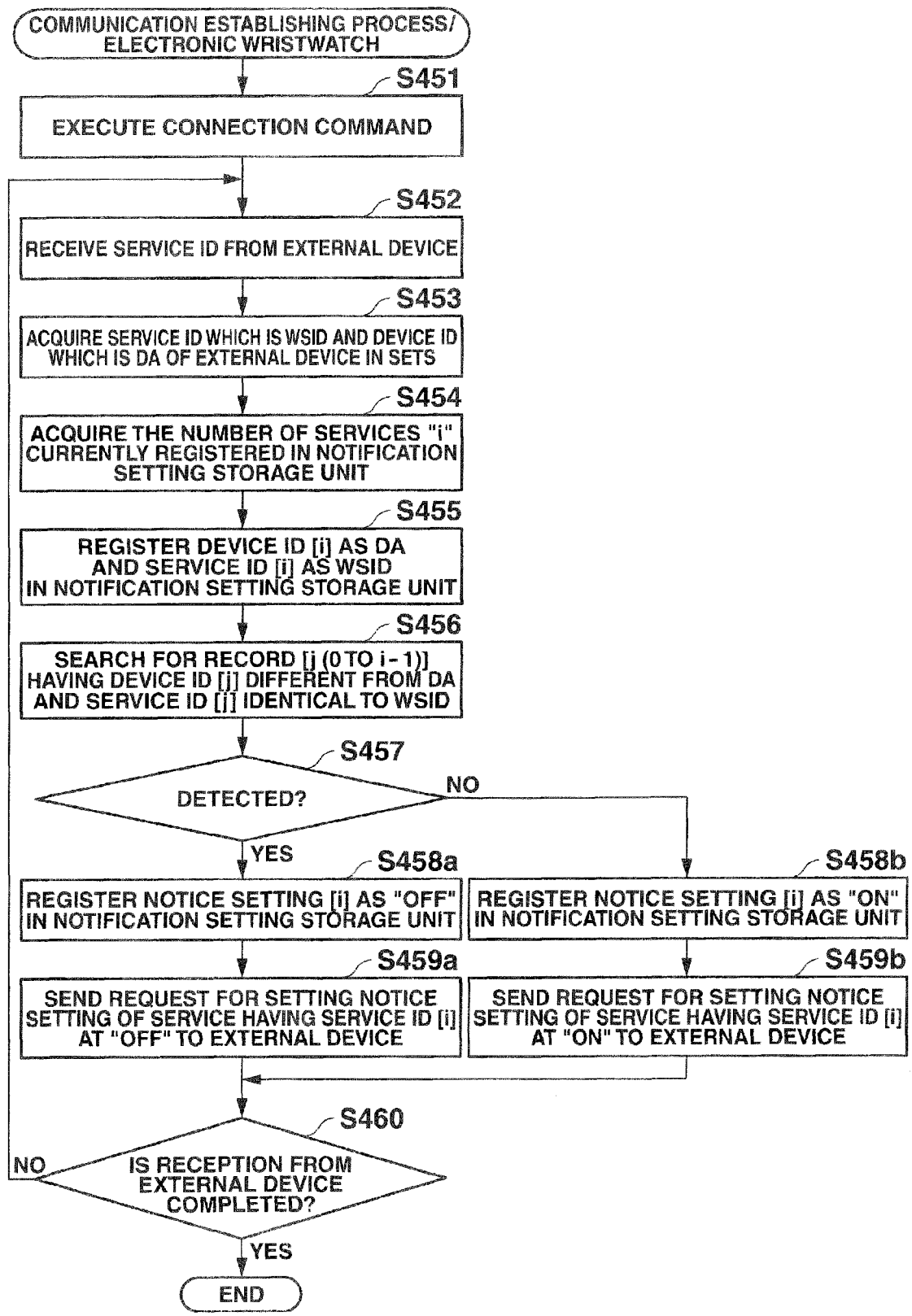
FIG. 7 is a flow chart illustrating a control process for establishing communications of an electronic wristwatch.

FIG. 7 is a flow chart illustrating a control process for establishing the Bluetooth communications between the electronic wristwatch 400 and the external device 100, the process being controlled by the CPU 41.

The CPU 41 establishes the communications with the external device 100 and executes a variety of connection commands to carry out various initial settings (Step S451).

The CPU 41 acquires the device ID of the external device 100 at this time.

Upon the establishment of the communications with the external device 100, the CPU 41 receives the service IDs of running communication services from the external device 100 in sequence (Step S452).

Upon the reception of the service IDs from the external device 100, the CPU 41 acquires the service IDs and the device ID of the external device 100 in sets (Step S453).

The CPU 41 then reads out the number of services "i" currently registered in the notification setting storage unit 43*a* (Step S454).

The CPU 41 registers the acquired device ID and one of the acquired service IDs respectively as a device ID [i] and a service ID [i] in association with each other, [i] representing the i-th record in the table data stored in the notification setting storage unit 43*a* (Step S455).

The CPU 41 also sets a default notice setting [i] at "OFF" at this time.

The CPU 41 then searches records [0] to [i−1], which are registered in the notification setting storage unit 43*a*, for a record [j] having a device ID different from the newly registered device ID [i], and also having a service ID identical to the newly registered service ID [i] (Step S456).

If a record meeting the criteria is detected ("YES" in Step S457), the CPU 41 registers the notice setting [i] in the notification setting storage unit 43*a* as "OFF" (Step S458*a*).

The CPU 41 also instructs the Bluetooth module 48 to send a request to the external device 100 for turning off an event occurrence notice associated with the service ID [i] (Step S459*a*).

The CPU 41 then carries out Step S460.

When one record that meets the criteria is detected in Steps S456 and S457, the CPU 41 may carry out Step S458*a* without searching the remaining records, in the process for establishing communications according to the first embodiment.

In the case of some records having the same service ID [i] in the notification setting storage unit 43*a*, Step S456 assumes that any one notice is set at "ON" even if the notice in a detected record is set at "OFF." Alternatively, a notice set at "ON" may be included in the search criteria in addition to the above.

If no record that meets the criteria is detected in the searching of Step S456 ("NO" in Step S457), the CPU 41 registers the notice setting [i] in the notification setting storage unit 43*a* as "ON" (Step S458*b*).

The CPU 41 also instructs the Bluetooth module 48 to send a request to the external device 100 for turning on an event occurrence notice associated with the service ID [i] (Step S459*b*).

The CPU 41 then carries out Step S460.

In Step S460, the CPU 41 determines whether all the items of data for establishing communications are received from the external device 100.

If the receipt of the data has not been completed, the CPU 41 carries out Step S452 for receiving a remaining service ID from the external device 100. If the receipt of the data has been completed, the CPU 41 finishes the process for establishing communications.

Figure 8A:
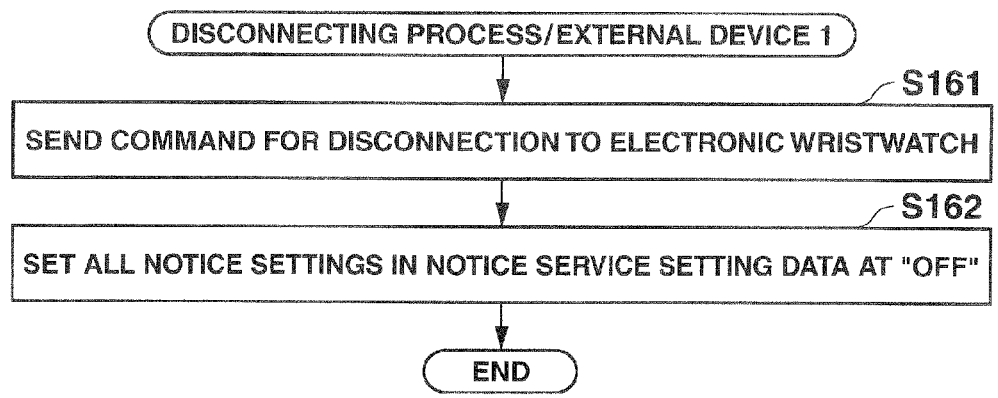
FIGS. 8A and 8B are flow charts illustrating control processes for interrupting communications of external devices.
Figure 8B:
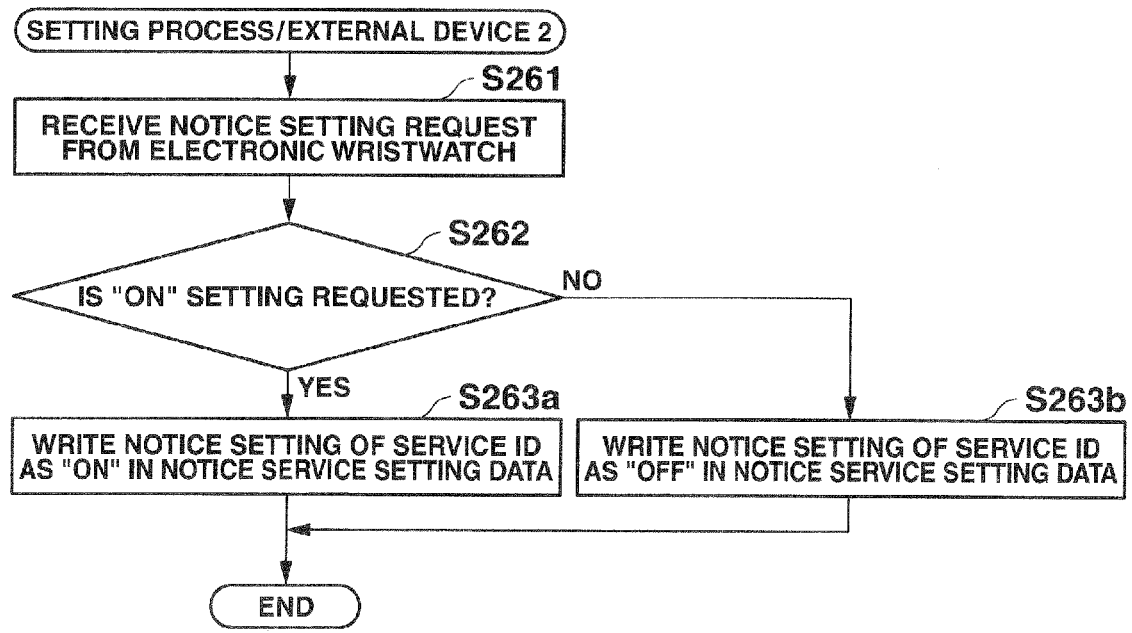

FIGS. 8A and 8B are flow charts illustrating control processes for disconnecting the external devices 100 from the electronic wristwatch 400.

The CPU 11 of the external device 100 causes the Bluetooth module 24 to send a command to the electronic wristwatch 400 for disconnecting the external device 100 from communication with the electronic wristwatch 400, as illustrated in FIG. 8A (Step S161).

The CPU 11 also sets all the notices of the services set in the notice service setting data 14*a* at "OFF" (Step S162).

The CPU 11 then disconnects the external device 100 from the communications with the electronic wristwatch 400 to finish the disconnection process.

If the notice service program 12*b* runs only while Bluetooth communications are established, the CPU 11 may clear all the contents of the notice service setting data 14*a* or delete the notice service setting data 14*a* in Step S162, thereafter terminating the notice service program 12*b*.

Figure 9:
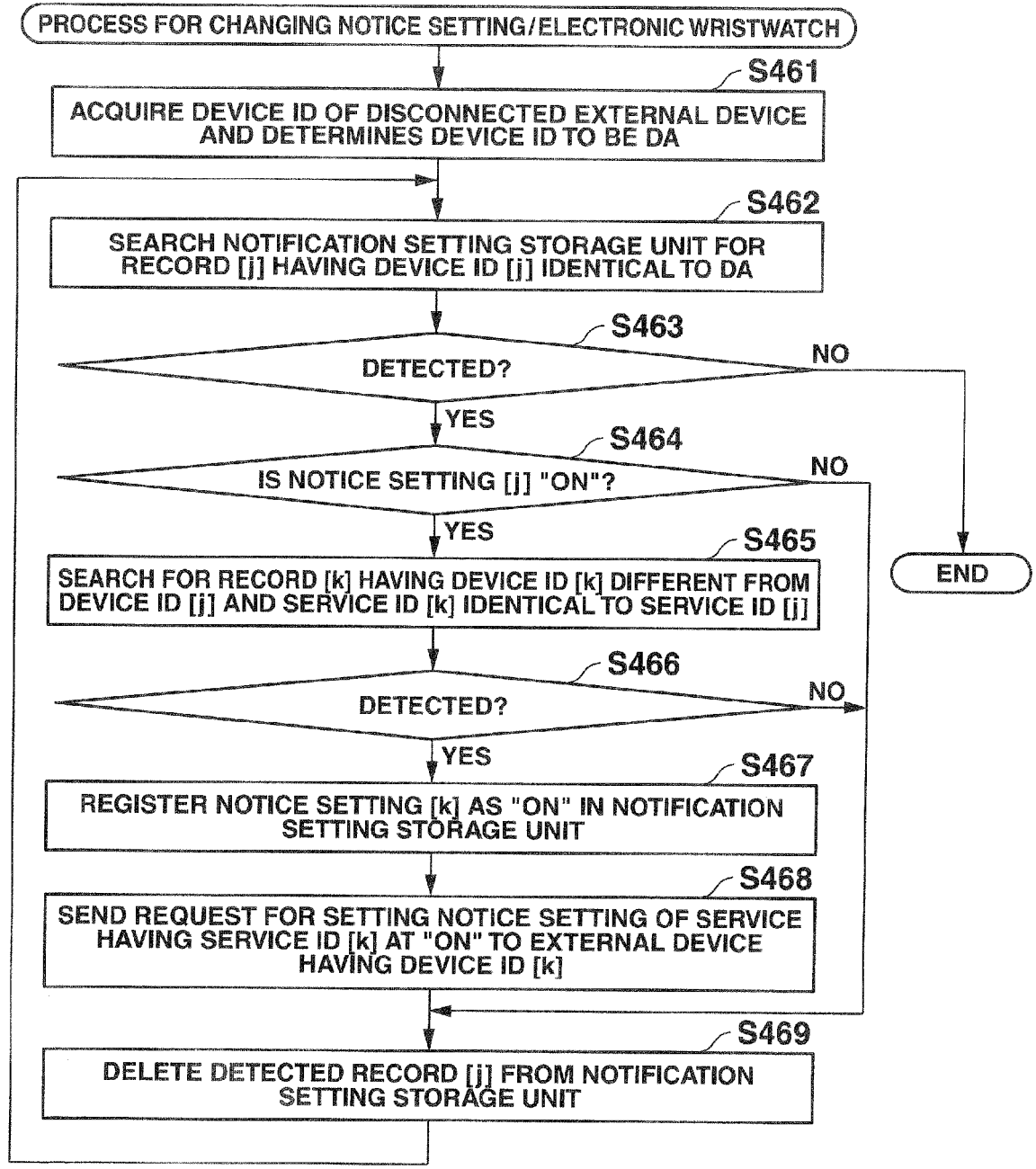
FIG. 9 is a flow chart illustrating a control process for interrupting communications of an electronic wristwatch.

FIG. 9 is a flow chart illustrating a control process for changing a notice setting in the electronic wristwatch 400 upon the disconnection of the external device 100 from the electronic wristwatch 400, the process being controlled by the CPU 41.

The process for changing a notice setting is started on the reception of a command to disconnect communications from the external device 100.

The CPU 41 acquires the device ID of a disconnected external device and determines the ID to be a variable DA (Step S461).

The CPU 41 then searches the records stored in the notification setting storage unit 43*a* for the record having this device ID, from top to bottom of the table in sequence (Step S462).

If a record [j] having a device ID equal to the variable DA is detected ("YES" in Step S463), the CPU 41 determines whether the notice setting [j] in the record [j] is set at "ON" (Step S464).

If the notice setting [j] is not set at "ON", the CPU 41 carries out Step S469. If the notice setting [j] is set at "ON", the CPU 41 further searches the notification setting storage unit 43*a* for a record [k] having a device ID different from the device ID [j] and a service ID identical to the service ID [j] (Step S465).

If the record [k] that meets the criteria is detected in the notification setting storage unit 43*a* ("YES" in Step S466), the CPU 41 changes the notice setting [k] of the record [k] to be registered as "ON" (Step S467).

The CPU 41 also instructs the Bluetooth module 48 to send a request to the external device 100 having the device ID [k], for setting the notice setting of a service ID [k] at "ON" (Step S468).

The CPU 41 then carries out Step S469.

If no record that meets the criteria is detected in Step S465 ("NO" in Step S466), the CPU 41 also carries out Step S469.

In Step S469, the CPU 41 deletes the record detected in Step S462 from the table in the notification setting storage unit 43*a*.

The CPU 41 then carries out Step S462 again to search for another record having the device ID.

In Step S462, if no record having the device ID equal to that of a disconnected external device 100 is detected ("NO" in Step S463), the CPU 41 finishes the process for changing a notice setting.

In Step S468, the notice settings for the services of the service IDs in other external devices 100 that maintain communications is changed.

These other external devices 100 each start the setting process in response to a notice setting from the electronic wristwatch 400, as illustrated in FIG. 8B.

The CPU 11 receives the setting data (Step S261) and determines whether the data represents a request for setting a notice setting at "ON" (Step S262).

If the CPU 11 determines the "ON" request, the CPU 11 rewrites the notice setting associated with the service ID in the notice service setting data 14*a*, as "ON" (Step S263*a*). If the CPU 11 determines the "OFF" request, the CPU 11 rewrites the notice setting as "OFF" in the notice service setting data 14*a* (Step S263*b*).

Thereafter, the CPU 11 finishes the setting process.

These other external devices 100 each send a notice of event occurrence to the electronic wristwatch 400 in response to the detection of an event that occurs after a notice setting at "ON" in the above process.

Note that the electronic wristwatch 400 may carry out the same process in response to disconnection from any one of the external devices 100 moving away from the coverage, as well as an express command for disconnection from the external device 100.

Each of the external devices 100 can also change an event occurrence notice to be "OFF" in the case of the detection of the disconnection from the electronic wristwatch 400.

The operation to start or end respective online service applications in one of the external devices 100 with communications between the external device 100 and the electronic wristwatch 400 being maintained will now be described.

Figure 10A:
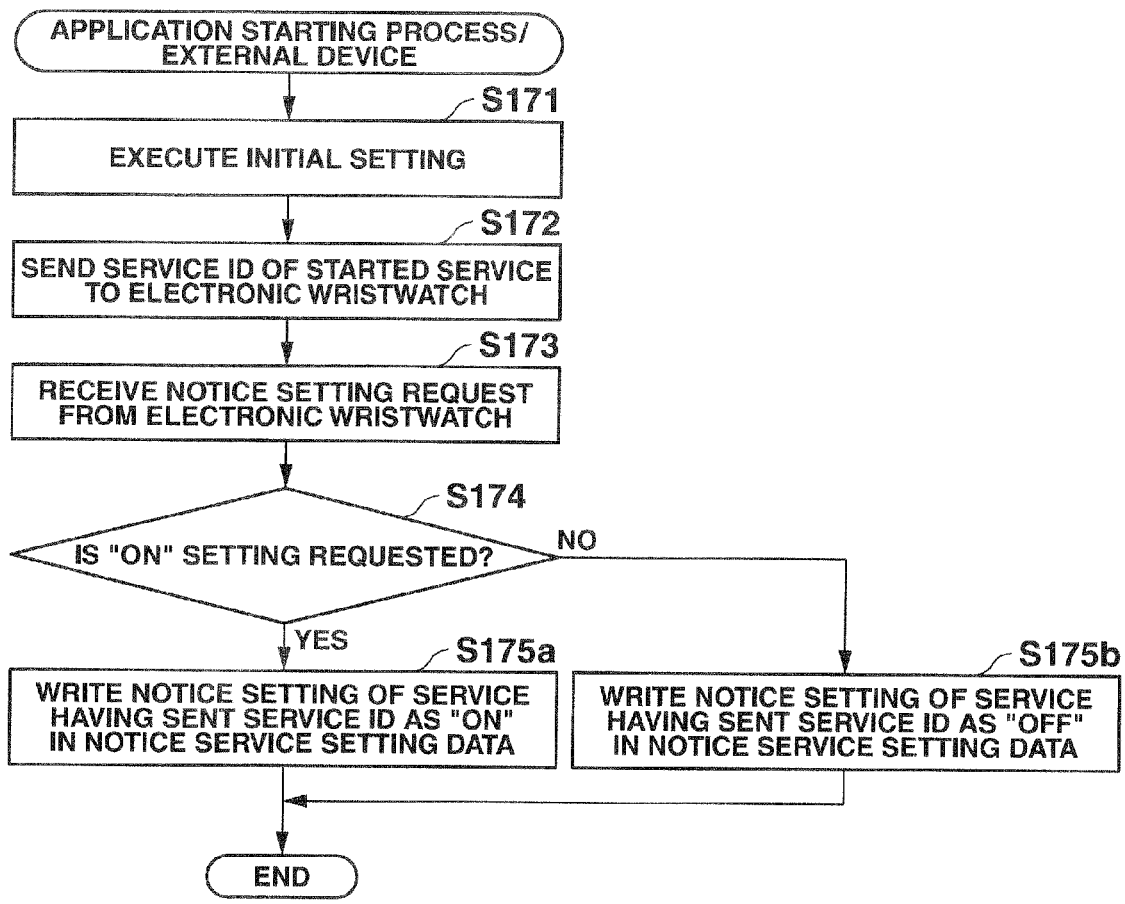
FIGS. 10A and 10B are flow charts illustrating control processes for starting up and terminating an application of an external device.
Figure 10B:
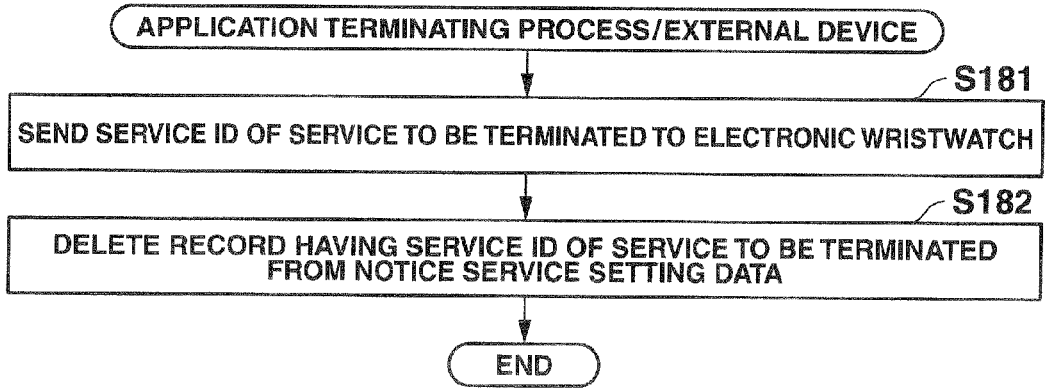

FIGS. 10A and 10B are flow charts illustrating the control processes of the CPU 11 executed in the external device 100, the processes starting or terminating an online service application with the communications to the electronic wristwatch 400 being maintained.

Upon the start-up of one of the online service applications 12a with communications between the external device 100 and the electronic wristwatch 400 being maintained, the CPU 11 carries out the initial setting of the online service, as illustrated in FIG. 10A (Step S171).

Specifically, the CPU 11 registers the service ID of the online service in the notice service setting data 14a.

At this time, the CPU 11 sets the notice setting associated with the service ID at "OFF" as the initial setting.

The CPU 11 then transmits a control signal to the Bluetooth module 24 which then sends the service ID of the started online service to the electronic wristwatch 400 (Step S172).

The CPU 11 then waits for a response from the electronic wristwatch 400, and receives the response (Step S173).

The CPU 11 acquires a notice setting of the service ID in the response data received from the electronic wristwatch 400, and then determines whether the request represents "ON", namely, an event occurrence notice is requested (Step S174).

If the received notice setting represents "ON", the CPU 11 writes "ON" as the notice setting in connection with registering the service ID in the notice service setting data 14a (Step S175a). If the received notice setting represents "OFF", the CPU 11 writes "OFF" as the notice setting in connection with registering the service ID in the notice service setting data 14a (Step S175b).

Thereafter, the CPU 11 finishes the application starting process.

To terminate the online service applications 12a with the communications between the external device 100 and the electronic wristwatch 400 being maintained, the CPU 11 sends a control signal to the Bluetooth module 24 which then transmits the service ID of this online service to the electronic wristwatch 400, as illustrated in FIG. 10B (Step S181).

The CPU 11 also deletes the record registered in the notice service setting data 14a (Step S182).

The CPU 11 then ends the application terminating process with the termination of the online service applications 12a.

Figure 11:
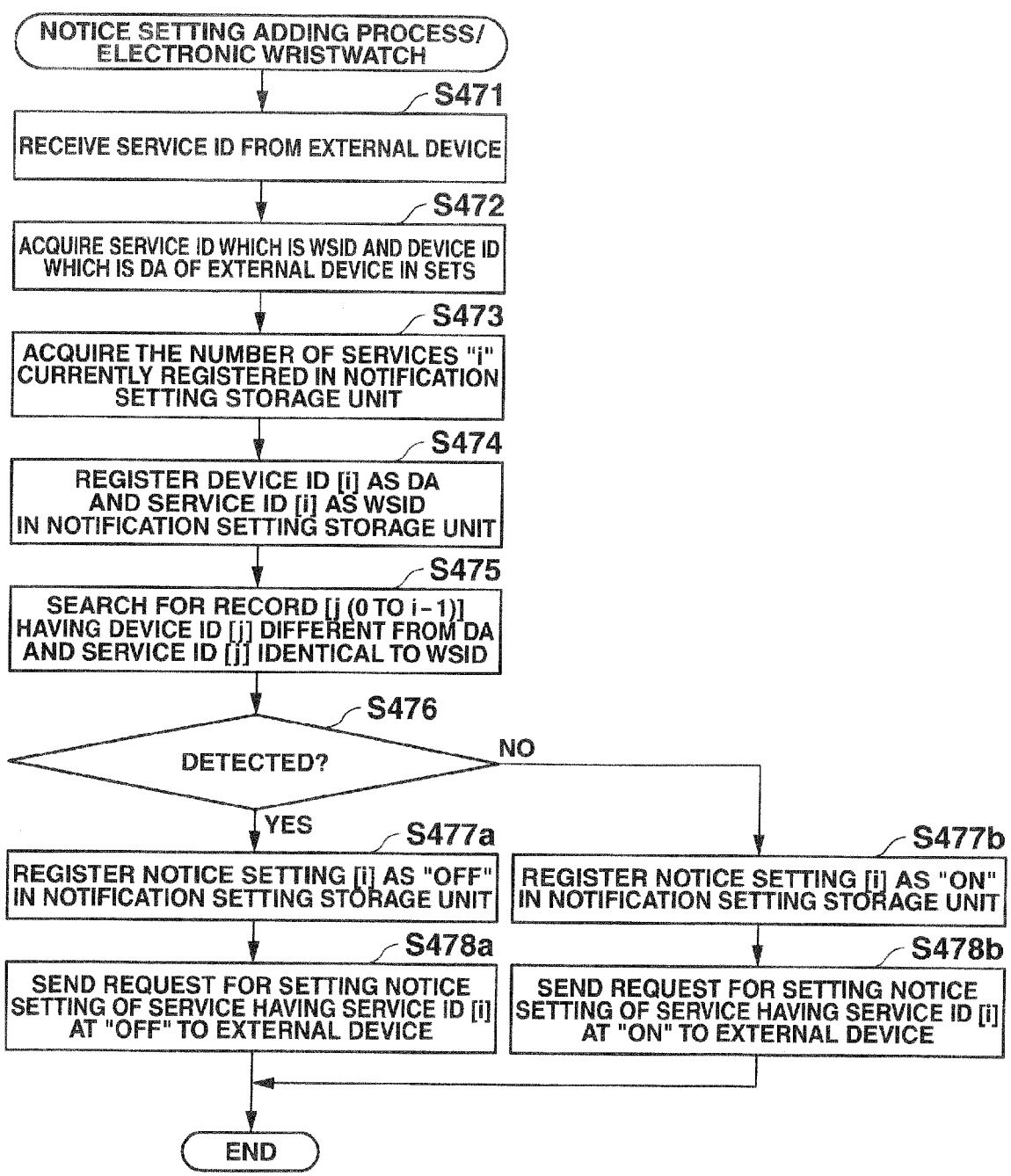
FIG. 11 is a flow chart illustrating a control process executed by an electronic wristwatch upon the start-up of the application of the external device.

FIG. 11 is a flow chart illustrating a control process for adding a notice setting in the electronic wristwatch 400, upon the start-up of one of the online service applications 12a in any one of the external devices 100 maintaining communications, the process being controlled by the CPU 41.

The process for adding a notice setting is started by the electronic wristwatch 400 which received the service ID transmitted from the external device 100 in Step S172 of the application starting process executed by the external device 100, illustrated in FIG. 10A.

The CPU 41 receives the service ID of the started service from the external device 100 (Step S471).

Upon the reception of the service ID from the external device 100, the CPU 41 acquires the service ID and the device ID of the external device 100 in sets (Step S472).

The CPU 41 then reads out the number of records "i" registered in the notification setting storage unit 43a (Step S473) and additionally registers the service ID (variable WSID) and the device ID (variable DA) respectively as a service ID [i] and a device ID [i] of the record [i] in the notification setting storage unit 43a (Step S474).

The CPU 41 also sets a default notice setting [i] at "OFF".

The CPU 41 then searches the table in the notification setting storage unit 43a for a record having a device ID [j] different from the variable DA and also having a service ID [j] identical to the variable WSID (Step S475).

If a record that meets the criteria is detected ("YES" in Step S476), the CPU 41 registers the notice setting [i] of the record [i] as "OFF" (Step S477a).

The CPU 41 also transmits a control signal to the Bluetooth module 48 which then transmits a request to the external device 100 having the device ID (variable DA) of the record [i] for setting an event occurrence notice associated with the online service having the variable WSID of the service ID at "OFF" (Step S478a).

The CPU 41 then finishes the process for adding a notice setting.

If a record that meets the criteria is not detected in Step S475 ("NO" in Step S476), the CPU 41 registers the notice setting [i] of the record [i] as "ON" (Step S477b).

The CPU 41 also transmits a control signal to the Bluetooth module 48 which then sends a request to the external device 100 having the device ID (variable DA) of the record [i] for setting an event occurrence notice associated with the service having the variable WSID of the service ID at "ON" (Step S478b).

The CPU 41 then finishes the process for adding a notice setting.

Figure 12:
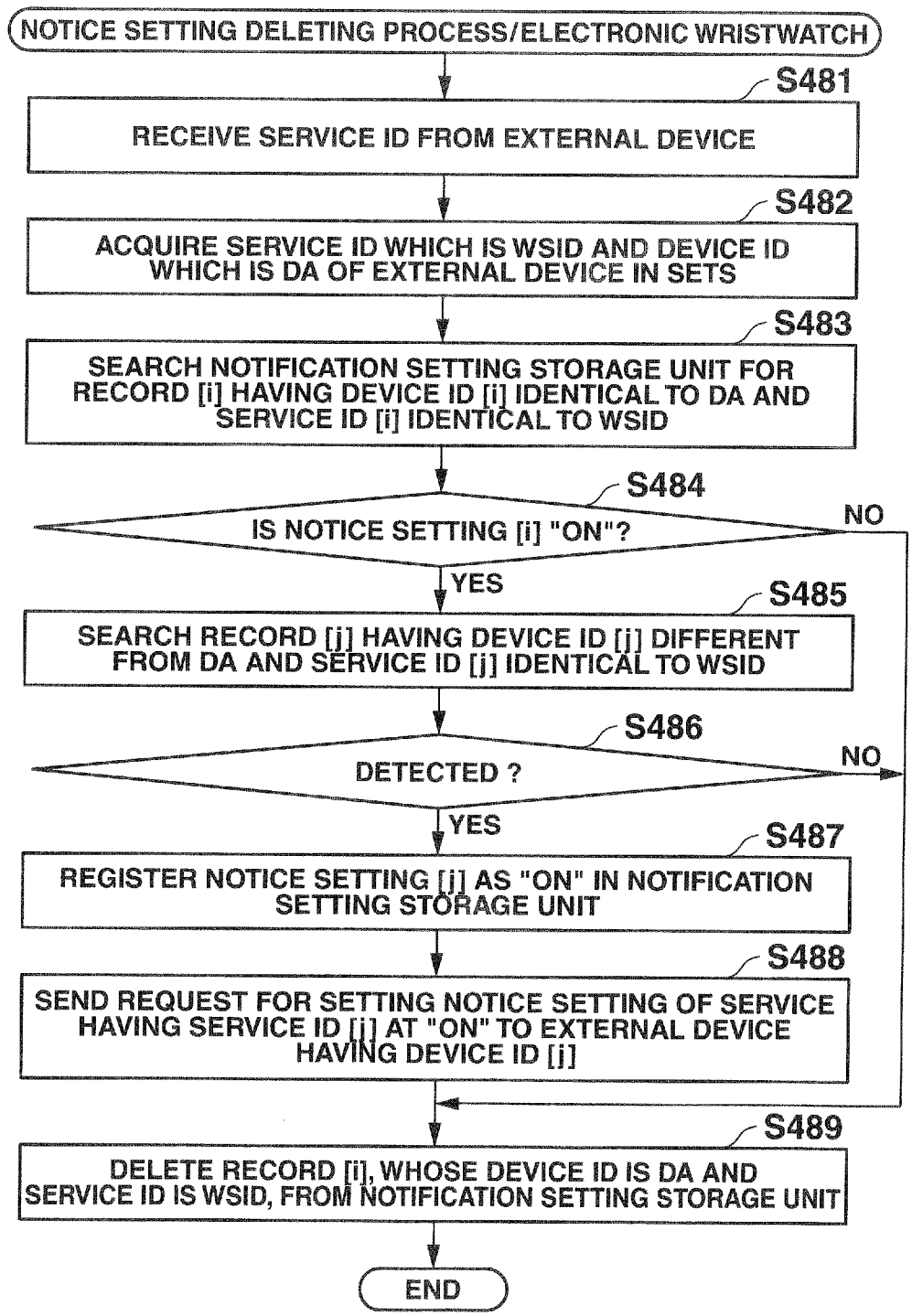
FIG. 12 is a flow chart illustrating a control process executed by the electronic wristwatch upon the end of the application of the external device.

FIG. 12 is a flow chart illustrating a control process for deleting a notice setting in the electronic wristwatch 400, upon the end of one of the online service applications 12a in any one of the external devices 100 maintaining communications, the process being controlled by the CPU 41.

The process for deleting a notice setting is started by the electronic wristwatch 400 which received the service ID transmitted in Step S181 of the application terminating process executed by the external device 100, illustrated in FIG. 10B.

The CPU 41 receives the service ID of the service to be terminated from the external device 100 (Step S481).

Upon the reception of the service ID from the external device 100, the CPU 41 acquires the service ID and the device ID of the external device 100 in sets (Step S482).

The CPU 41 then searches the notification setting storage unit 43a for a record [i] having a device ID [i] and a service ID [i] identical to the variables DA and WSID, respectively (Step S483).

Upon the detection of such a record [i], the CPU 41 determines whether the notice setting [i] of the record [i] is registered as "ON" (Step S484).

If the notice setting [i] is set at "ON", the CPU 41 searches for a record [j] having a device ID [j] different from the variable DA and also having a service ID [j] identical to the variable WSID, for example, from top to bottom of the table in sequence (Step S485).

If the record [j] that meets the criteria is detected ("YES" in Step S486), the CPU 41 updates the registration of the notice setting [j] of the record [j] as "ON" (Step S487).

The CPU 41 also transmits a control signal to the Bluetooth module 48 which then sends a request to another external device 100 having the device ID [j] in the record [j], for turning on the event occurrence notice associated with the service ID [j] (Step S488).

The CPU 41 then deletes the record [i] from the notification setting storage unit 43a (Step S489).

If it is determined that the notice setting [i] is "OFF" in Step S484 and if it is determined in Step S486 that no record [j] that meets the criteria is found in Step S485, then the CPU 41 carries out Step S489.

The CPU 41 then deletes the record [i] from the notification setting storage unit 43a (Step S489).

Upon the deletion of the record [i] from the notification setting storage unit 43a, the CPU 41 finishes the process for deleting a notice setting.

In this manner, the electronic wristwatch 400 of the first embodiment, or the electronic wristwatch 400 in the event notification system 1, acquires a predetermined event occurrence notice associated with an online service W from any one of the external devices 100 via the Bluetooth module 48 capable of wirelessly communicating with these external devices 100.

The CPU 41 then notifies the user of the occurrence of the event on the basis of the event occurrence notice by displaying predetermined information on the display unit 46 or by operating the vibration motor 50, the LED 52, or the piezoelectric element 54.

If the multiple external devices 100 can duplicately send the same event notice to the electronic wristwatch 400, the CPU 41 transmits a request for sending an event occurrence notice to any one of the external devices 100, thereby preventing the redundant reception of the same event occurrence notice and duplicate notification about event occurrence.

Furthermore, each time the number of an event occurrence notices that can be sent to the electronic wristwatch 400 varies due to the establishment and interruption of communications or the start-up and end of the online service applications 12a in the external device 100, information is automatically sent from the external device 100 to the electronic wristwatch 400 to determine a new external device 100 to be allowed to send an event occurrence notice.

As a result, the electronic wristwatch 400 can automatically receive a notice of event occurrence without duplication and loss and then notify the user of the event occurrence.

Moreover, the simple resetting of a notice setting based on, for example, the order of registered enabled-notice information eliminates an undesired load on the electronic wristwatch 400.

Also, since a list, from the external device 100, showing the devices that can send an event occurrence notice is stored in the notification setting storage unit 43a as a table, the device to send an event occurrence notice can be readily determined on the basis of the table data.

Even if another external device 100 that can send an event occurrence notice is newly connected to the electronic wristwatch 400 which already receives the same event occurrence notice, the device to send the notice remains unswitched. Accordingly, the electronic wristwatch 400 can certainly receive an event occurrence notice from one external device 100 without an increased power consumption caused by unnecessary processing.

The table data stored in the notification setting storage unit 43a is updated upon each variation of the number of event occurrence notices that can be sent to the electronic wristwatch 400.

Reception setting can be carried out by readily retrieving appropriate data from the device IDs and service IDs in the latest data stored in the notification setting storage unit 43a.

Thus, each setting need not acquire various types of data from the external devices 100.

Upon the establishment of the communications with one of the external devices 100, the notice settings of event occurrence notices that can be sent from the external device 100 are collectively set again.

If another online service application 12a associated with an event occurrence notice is started in the external device 100 maintaining communications, the notice setting for the event occurrence notice is set again as appropriate.

In contrast, if the communications with the external device 100 are interrupted or if one of the online service applications 12a associated with an event occurrence notice is terminated in the external device 100 maintaining communications, then only the disabled event occurrence notice having the "ON" notice setting is set again.

That is, the event occurrence notice unrelated to the interruption or termination can continue without any unnecessary processing.

In the event notification system 1 including the electronic wristwatch 400 and the external devices 100 according to the embodiment, upon each occurrence of an event associated with an online service to which the external device 100 is connectable, the notice service program 12b can send an event occurrence notice to the electronic wristwatch 400. A request from the electronic wristwatch 400 determines whether to actually send the event occurrence notice.

As a result, an event occurrence notice can be readily turned on or off in the case of another external device 100 using the same online service W.

Even in the accidental disconnection of the electronic wristwatch 400 from the external device 100, prompt connection recovery of both the external device 100 and the electronic wristwatch 400 prevents an unnecessary operation in the external device 100.

Furthermore, the electronic wristwatch 400 can completely receive a corresponding event occurrence notice from another external device at the above accidental disconnection.

[Second Embodiment]

An event notification system 1 of a second embodiment will now be described.

The event notification system 1 of the second embodiment has the same configuration as the configuration of the event notification system of the first embodiment. Hence, a description thereof is omitted.

External devices 100 of the second embodiment also have the same internal configurations as the internal configurations of the external devices 100 of the first embodiment. Hence, a description thereof is also omitted.

Figure 13:
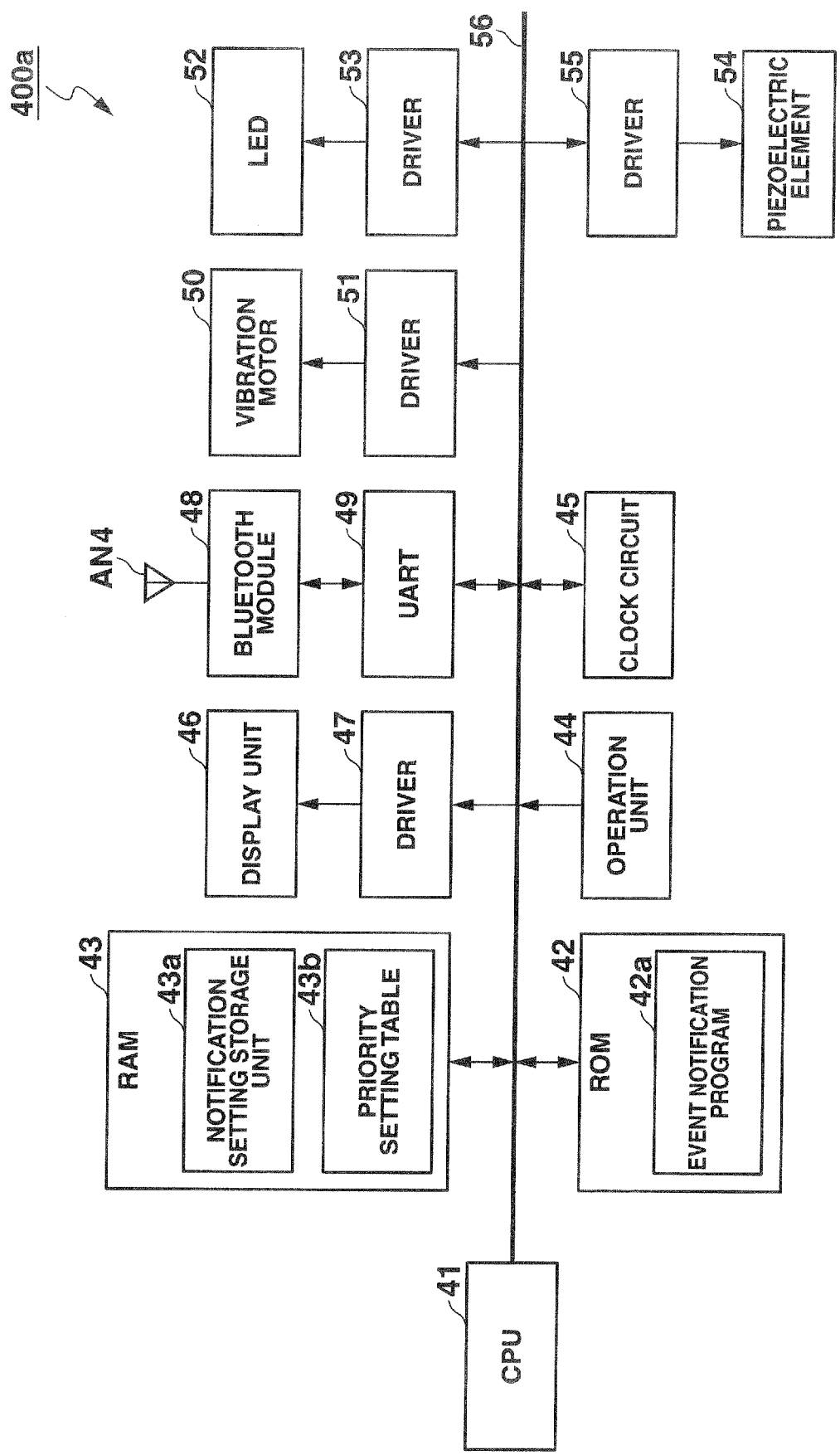
FIG. 13 is a block diagram illustrating the internal configuration of an electronic wristwatch according to a second embodiment.

FIG. 13 is a block diagram illustrating the internal configuration of an electronic wristwatch 400a which is a component of the event notification system 1 according to the second embodiment.

The electronic wristwatch 400a according to the second embodiment is different from the electronic wristwatch 400 of the first embodiment only in a priority setting table 43b (priority storage unit) in the RAM 43; hence, the same reference numerals are denoted for the same components to omit detailed description thereof.

FIGS. 14A and 14B are tables illustrating examples of the contents of priority setting tables 43b.

The priority setting table 43b in the electronic wristwatch 400a includes data indicating priorities assigned to the multiple external devices 100 for setting a notice setting at "ON", the devices capable of sending an event notice associated with the same service ID.

The priorities of external devices may be fixed in the sequence of the external devices irrespectively of the individual services as illustrated in FIG. 14A, or may also be fixed for each service ID as illustrated in FIG. 14B.

The priorities are preliminarily determined on the basis of a user operation and stored in the RAM 43.

Figure 15:
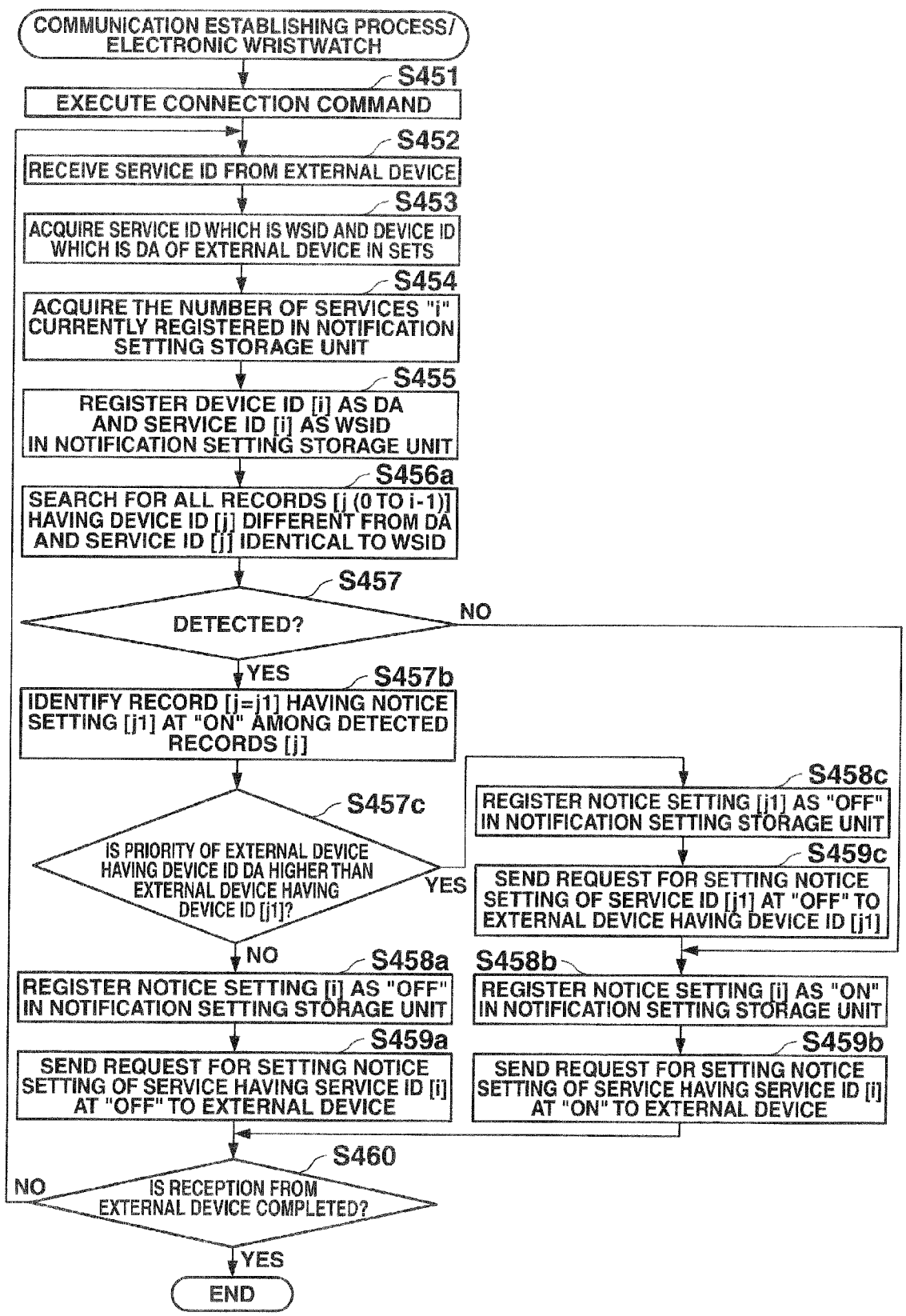
FIG. 15 is a flow chart illustrating a control process for establishing communications of the electronic wristwatch according to the second embodiment.

FIG. 15 is a flow chart illustrating a control process for establishing communications in the electronic wristwatch 400a of the second embodiment, the process being controlled by the CPU 41.

In comparison with the process for establishing communications in the electronic wristwatch 400 of the first embodiment, the process in the electronic wristwatch 400a of the second embodiment has Step S456a, which substitutes for Step S456.

Steps S457b and S457c are added between Steps S457 and Step S458a.

Steps S458c and S459c are also added between Steps S457c and S458b.

The other steps remain unchanged and are denoted with the same reference numerals to omit detailed description thereof.

In Step S456a, the CPU 41 searches the notification setting storage unit 43a for every record having a device ID different from the variable DA and also having a service ID identical to the variable WSID.

If one or more records are detected ("YES" in Step S457), the CPU 41 further identifies a record [j1] that has the "ON" notice setting among the detected records (Step S457b).

The CPU 41 reads out the priorities of external devices respectively associated with the device ID [j1] and the variable DA from the priority setting table 43b and determines whether the priority of the external device 100 having the variable DA is higher than the priority of the other devices (Step S457c).

If the priority of the external device 100 having the variable DA is lower, the CPU 41 carries out Step S458a to set the notice setting [i] at "OFF".

If the priority of the external device 100 having the variable DA is higher than the external device 100 having the device ID [j1], the CPU 41 rewrites the notice setting [j1] in the notification setting storage unit 43a to be registered as "OFF" (Step S458c).

The CPU 41 also transmits a control signal to the Bluetooth module 48 which then sends a request for setting the notice associated with the service ID [j1] at "OFF" to the external device 100 having the device ID [j1] (Step S459c).

The CPU 41 then carries out Step S458b to write and register "ON" as the notice setting [i].

If the priority of the external device 100 newly establishing communication is higher than the priority of other external device 100 currently sending an event occurrence notice among event occurrence notices that can be noticed from the new external device, the new external device 100 starts to send the same event occurrence notice in place of the other external device above.

Figure 16:
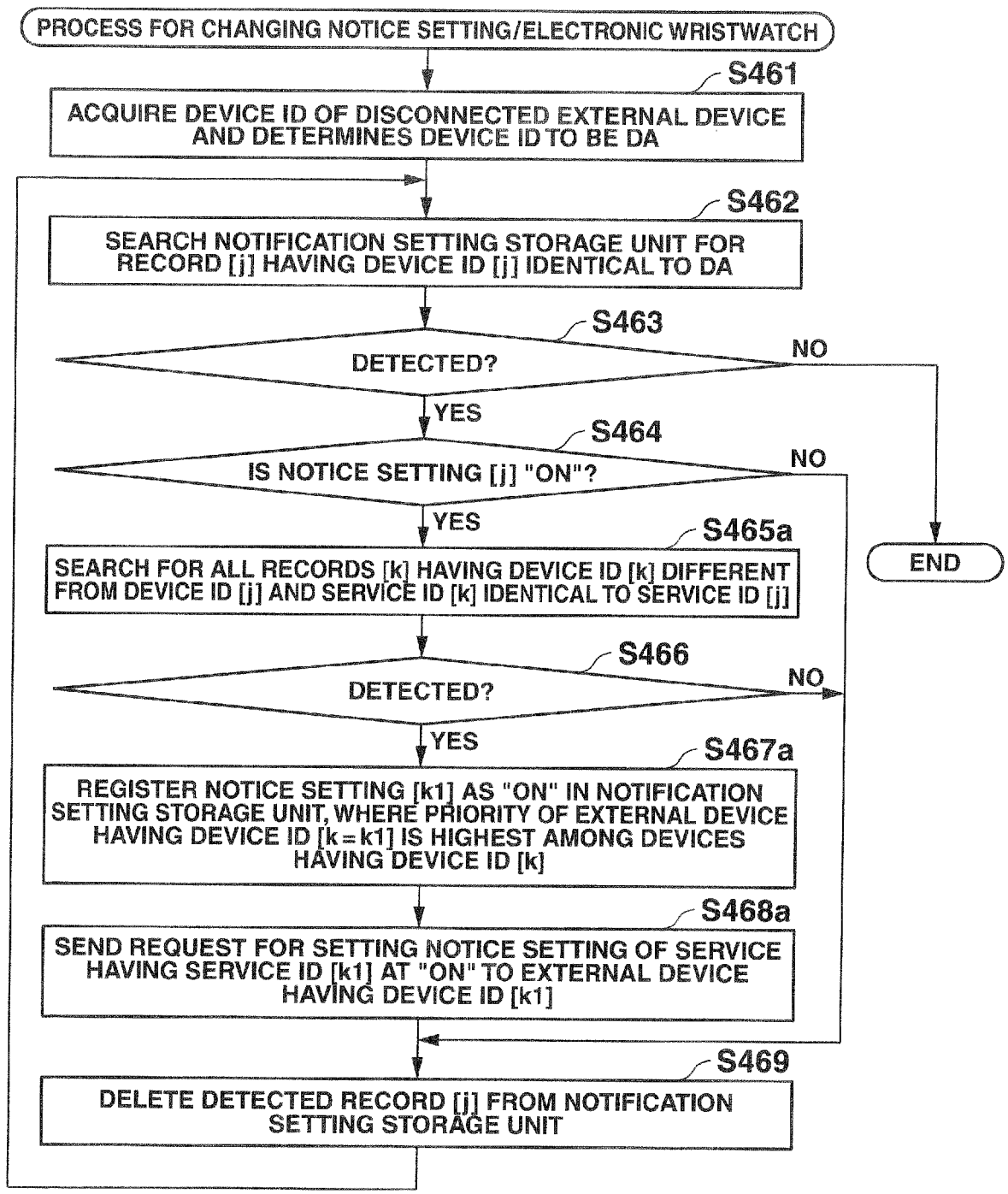
FIG. 16 is a flow chart illustrating a control process for interrupting communications of the electronic wristwatch according to the second embodiment.

FIG. 16 is a flow chart illustrating a control process for changing a notice setting in the electronic wristwatch 400a of the second embodiment, the process being controlled by the CPU 41.

In comparison with the process for changing a notice setting in the electronic wristwatch 400 of the first embodiment, the process in the electronic wristwatch 400a of the second embodiment has Steps S465a and S467a, which substitute for Steps S465 and S467 respectively.

The other steps remain unchanged and are denoted with the same reference numerals to omit detailed description thereof.

If it is determined that the notice setting [j] is "ON" in Step S464, the CPU 41 searches the notification setting storage unit 43a for every record [k] having a device ID different from the device ID [j] and also having a service ID identical to the service ID [j] (Step S465a).

If one or more such records [k] are detected ("YES" in Step S466), the CPU 41 identifies a device ID [k1] in the priority setting table 43b, the priority of the external device having the ID [k1] being highest among the devices of the device ID [k], and then changes the notice setting [k1] to be registered as "ON" (Step S467a).

The CPU 41 also outputs a control signal to the Bluetooth module 48 which then sends a request for setting the event occurrence notice associated with the service ID [k1] at "ON" to the external device 100 having the device ID [k1] (Step S468a).

Thus, the disabled reception of an event occurrence notice due to the disconnection of the communications to the external device 100 having the "ON" notice setting associated with one of the online service applications 12a will set at "ON" the notice setting of the highest-priority one of the other external devices 100 that can send the same event occurrence notice.

Figure 17:
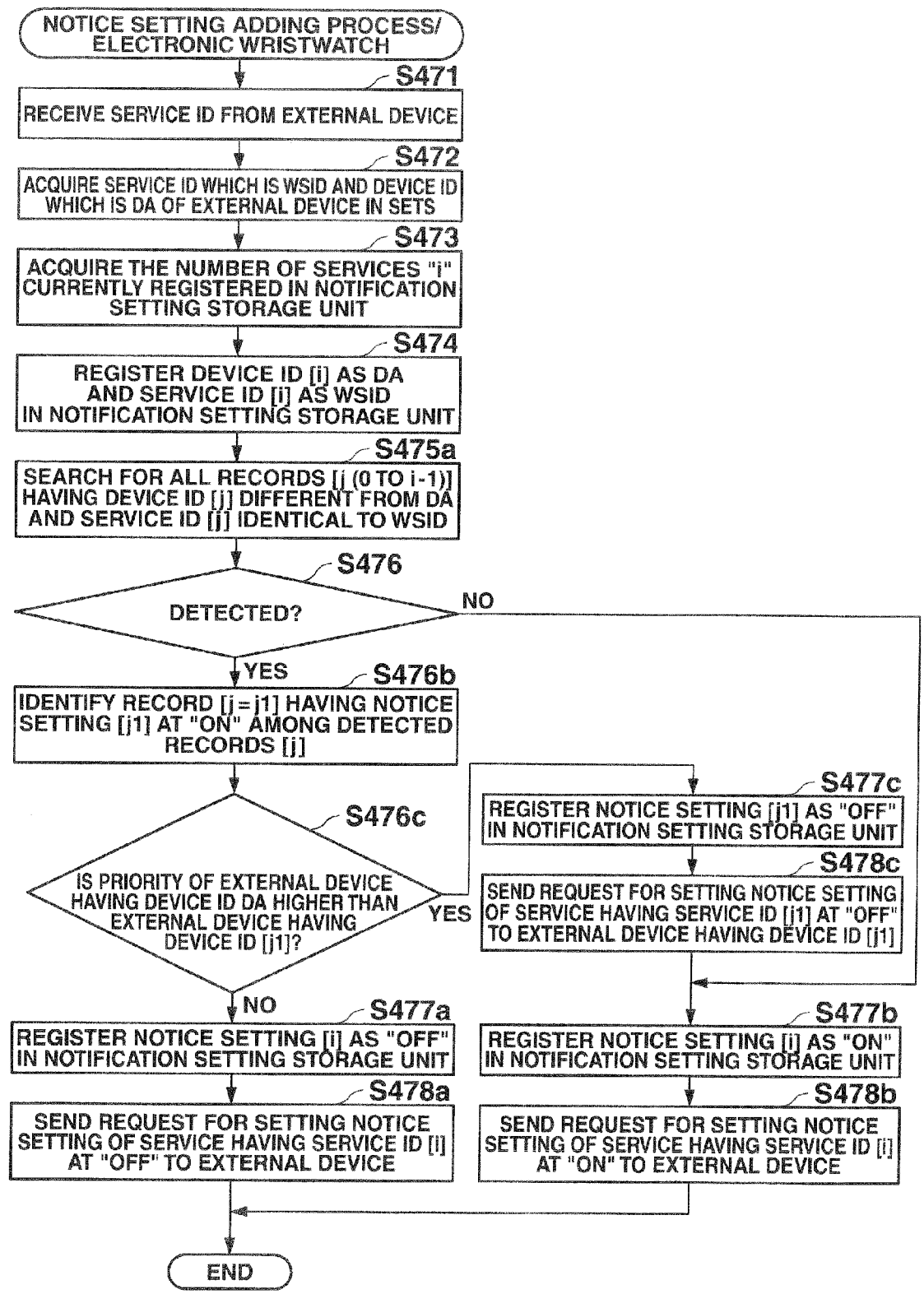
FIG. 17 is a flow chart illustrating a control process executed by the electronic wristwatch according to the second embodiment upon the start-up of the application of the external device.

FIG. 17 is a flow chart illustrating a control process for adding a notice setting in the electronic wristwatch 400a of the second embodiment, the process being controlled by the CPU 41.

In comparison with the process for adding a notice setting in the electronic wristwatch 400 of the first embodiment, the process in the electronic wristwatch 400a of the second embodiment has Step S475a, which substitutes for Step S475, and also has additional Steps S476b, S476c, S477c, and S478c.

The other steps remain unchanged and are denoted with the same reference numerals to omit detailed description thereof.

In Step S475a, the CPU 41 searches the notification setting storage unit 43a for every record having a device ID different from the variable DA and also having a service ID identical to the variable WSID.

If one or more such records are detected ("YES" in Step S476), the CPU 41 further identifies a record [j1] that has the "ON" notice setting among the detected records (Step S476b).

The CPU 41 reads out the priorities of the external devices respectively associated with the device ID [j1] and the variable DA from the priority setting table 43b and determines whether the priority of the external device having the variable DA is higher than the priority of the other devices (Step S476c).

If the priority of the external device having the variable DA is lower, the CPU 41 carries out Step S477a to set the notice setting [i] at "OFF".

If the priority of the external device having the variable DA is higher than that of the external device having the device ID [j1], the CPU 41 rewrites the notice setting [j1] in the notification setting storage unit 43a to be registered as "OFF" (Step S477c).

The CPU 41 also transmits a control signal to the Bluetooth module 48 which then sends a request for setting the notice associated with the service ID [j1] at "OFF" to the external device 100 having the device ID [j1] (Step S478c).

The CPU 41 then carries out Step S477b to write and register "ON" as the notice setting [i].

Thus, if the priority of a new external device 100 as to the event occurrence notice added upon the start-up of one of the online service applications 12a is higher than the priority of other external device currently sending the event occurrence notice of the same application, then the new external device 100 starts to send the event occurrence notice in place of the other external device above.

Figure 18:
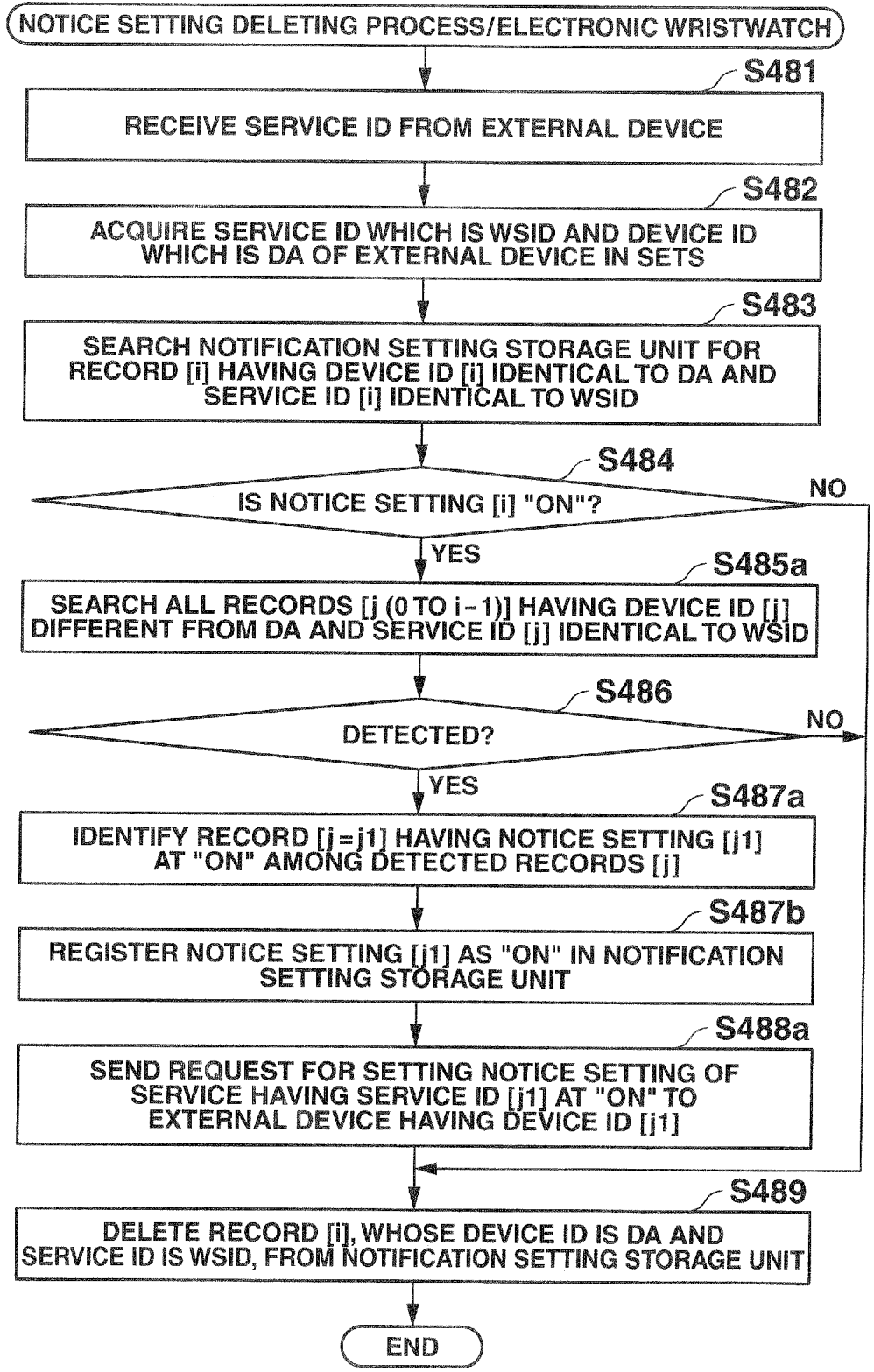
FIG. 18 is a flow chart illustrating a control process executed by the electronic wristwatch according to the second embodiment upon the end of the application of the external device.

FIG. 18 is a flow chart illustrating a control process for deleting a notice setting in the electronic wristwatch 400a of the second embodiment, the process being controlled by the CPU 41.

In comparison with the process in the electronic wristwatch 400 of the first embodiment, the process in the electronic wristwatch 400a of the second embodiment has Step S485a, which substitutes for Step S485.

Step S487 of the first embodiment is divided into Step S487a and S487b.

The other steps remain unchanged are denoted with the same reference numerals to omit detailed description thereof.

If it is determined that the notice setting [i] is "ON" in Step S484, the CPU 41 searches the notification setting storage unit 43a for every record [j] having a device ID different from the device ID [i] and a service ID identical to the service ID [i] (Step S485a).

If one or more such records [j] are detected ("YES" in Step S486), the CPU 41 identifies a record [j1] associated with the highest priority among the records [j] in the priority setting table 43b (Step S487a).

The CPU 41 also updates the notice setting [j1] to be registered as "ON" (Step S487b).

The CPU 41 outputs a control signal to the Bluetooth module 48 which then sends a request for setting the notice associated with the service ID [j1] at "ON" to the external device 100 having the device ID [j1] (Step S488a).

The CPU 41 then carries out Step S489.

Thus, the termination of one of the online service applications 12a associated with the "ON" notice setting in the external device 100 will change the notice setting of the highest-priority one of the other external devices 100 that can send the same event occurrence notice to "ON".

According to the electronic wristwatch 400a and the event notification system 1 of the second embodiment, each time the number of external devices 100 that can send one event occurrence notice to the electronic wristwatch 400 increases, a device to send the event occurrence notice is redetermined on the basis of the priorities preliminarily set, as hereinbefore described.

Accordingly, the optimum transmitting device can be selected as appropriate depending on the conditions of the wireless communications with the multiple external devices 100.

Also, holding the device ID, the service ID, and the notice setting of the external device 100 determined to transmit an event occurrence notice on the basis of the predetermined priorities facilitates the detection of the external device with the current "ON" notice setting.

Thus, the redetermination of the transmitting devices needs only the comparison of the priority associated with the active external device and the service ID with the priority associated with the device ID of a newly connected device and the same service ID, which further facilitates the easy determination.

Furthermore, the priority setting table 43b, which is prepared in advance, allows an external device 100 appropriate to usage of an user to preferentially transmit an event occurrence notice to the user.

Thus, even in the case of the external devices 100 having different frequencies of access to an online service, data on an event occurrence notice can be preferentially acquired with the access frequency desired by the user.

[Modification]

A modification of the event notification system 1 according to the second embodiment will now be described.

The event notification system 1 of the second embodiment preliminarily stores the priority setting table 43b in the RAM 43 of the electronic wristwatch 400a, whereas, instead of determining relative priorities, the event notification system 1 may also register the absolute value of the priority of a record (parameter) each time the notification setting storage unit 43a registers the record therein.

Every control process executed in the electronic wristwatch 400a in this modification is identical to the every process in the second embodiment.

Note that the priority-based determination of the external devices 100 in this modification substitutes the magnitudes of the stored priorities included in respective records for the priority setting table 43b.

In the case of equal absolute values of priorities, the external device 100 registered first can send the event occurrence notice, similarly to the electronic wristwatch 400 of the first embodiment.

According to the electronic wristwatch 400a of the modification, a record is registered with its priority in the notification setting storage unit 43a, which eliminates the need for having the priority setting table 43b separately.

In addition, the priorities based on the absolute values can be automatically set in this manner, which saves the user the trouble of determining relative priorities.

Furthermore, since a priority is set each time a record is registered in the notification setting storage unit 43a, the setting may be based on times and dates under various appropriate conditions.

Priorities can flexibly vary, for example, between the daytime connection to an office PC and the nighttime connection to a home PC.

Note that the present invention is not limited to the above embodiments and may be variously modified.

For example, the event notification device, which is the electronic wristwatch in the above embodiments, may also be any other device.

The present invention may also be applied to other wrist strapped terminals such as an electronic pedometer, which can save the user from carrying multiple external devices in hands.

Alternatively, a mobile phone may also function as an event notification device in place of a wrist strapped terminal.

The present invention may also be applied to a pocket watch and a small clock on a desk, in addition to a wrist watch.

The above embodiments use Bluetooth communications as an example wireless communication, whereas other near field wireless communications such as ultra wideband (UWB) technology may also be used as long as they can provide continuous connection or establish connection at a desired timing.

The above embodiments use information displayed on the display unit 46, LED light emission, vibrations by a vibration motor, or buzzer sound by a piezoelectric element to notify the user of the occurrence of an event, whereas other techniques may also be adopted.

Other types of light emission such as the light from an organic ELD may also be used.

Any one of the external devices 100 sends the event occurrence notices in the above embodiments, whereas the user may determine any one of the external devices 100 that does not send some or all of the event occurrence notices.

In the case of the disconnection, a device to send an event occurrence notice is instantly switched in the above embodiments even if the disconnection is accidental, whereas the switching may have a certain delay to avoid temporary noise.

Moreover, the details of the specific configurations, values, and processes in the above embodiments may be modified as appropriate without deviating from the gist of the present invention.

The description has been made above of some embodiments of the present invention; however, the scope of the present invention is not limited to the above-mentioned embodiments, and incorporates the scope of claims described in claims and equivalents to the scope of claims.

The entire disclosure of Japanese Patent Application No. 2012-061699 filed on Mar. 19, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An event notification device comprising:
a wireless communication unit which wirelessly transmits and receives predetermined information on an online service using a communication network over a period of maintaining communications with a plurality of external devices which can use the online service via the communication network;
an event occurrence information acquiring unit which acquires an event occurrence notice via the wireless communication unit from each of the external devices maintaining the communications, the event occurrence notice indicating the occurrence of a predetermined event of the online service being used by the external devices;
an enabled-notice information acquiring unit which acquires an enabled-notice information item on the event occurrence notice via the wireless communication unit, the event occurrence notice being transmittable from each of the external devices maintaining the communications;
a notice setting unit which requests one of the external devices to transmit the event occurrence notice and requests the other external devices not to transmit the event occurrence notice if the enabled-notice information items indicate that the external devices are capable of individually transmitting the same event occurrence notice; and
an event occurrence notification unit which notifies a user of the occurrence of the predetermined event by a predetermined operation on the basis of the event occurrence notice acquired by the event occurrence information acquiring unit from the external device requested by the notice setting unit to transmit the event occurrence notice.

2. The event notification device according to claim 1, further comprising:
a noticed-event storage unit which stores device identification information items and event identification information items in association with each other as an event notice information item, the device identification information items identifying the individual external devices on the basis of the acquired enabled-notice information items, and the event identification information items indicating a type of the event occurrence notice transmittable from the external device,
wherein the notice setting unit determines an external device allowed to transmit the event occurrence notice among the one or more external devices identified by the respective device identification information items associated with one of the event identification information items.

3. The event notification device according to claim 2, wherein the notice setting unit includes:
a notice source determining unit which determines a notice setting information item indicating the allowance to transmit the event occurrence notice to each of the external devices on the basis of predetermined priorities; and
a notice setting transmission control unit which allows the wireless communication unit to transmit the notice setting information item to the external devices,
wherein if the number of the external devices capable of transmitting the same event occurrence notice increases, the notice source determining unit redetermines another external device to be allowed to transmit the event occurrence notice on the basis of the predetermined priorities, and
the notice setting transmission control unit allows the wireless communication unit to transmit the notice setting information item on the redetermination to one or more external devices where determination about the allowance to transmit the event occurrence notice is newly determined or changed.

4. The event notification device according to claim 3, wherein
if an external device capable of transmitting the event occurrence notice which has been allowed to be transmitted from one allowed external device is added, the notice source determining unit inhibits the added external device from transmitting the event occurrence notice.

5. The event notification device according to claim 3, wherein
the notice setting unit includes a list updating unit which additionally stores event notice information on an added event occurrence notice in the noticed-event storage unit if the number of the external devices capable of transmitting the event occurrence notice increases, and
after the list updating unit updates the event storage unit, the notice source determining unit extracts one or more external devices identified by the one or more device identification information items associated with the event identification information items on the added event occurrence notice and redetermines another external device to be allowed to transmit the event occurrence notice.

6. The event notification device according to claim 3, wherein the event notice information item includes a notice setting information item associated therewith, and
wherein if an external device capable of transmitting one of the event occurrence notices is added, the notice source determining unit identifies one external device allowed to transmit the one of the event occurrence notices on the basis of the notice setting information item on the one of the event occurrence notice, the information being stored in the noticed-event storage unit, and resets the notice setting information item on the basis of the predetermined priorities between the authorized external device and the added external device.

7. The event notification device according to claim 3, wherein
if communications with an external device capable of transmitting the one or more event occurrence notices are established, the notice source determining unit resets all the notice setting information items on the event occurrence notice.

8. The event notification device according to claim 3, wherein
if the external device maintaining communications starts using the online service associated with the event occurrence notice, the notice source determining unit resets the notice setting information on the event occurrence notice.

9. The event notification device according to claim 3, wherein
if the communications with the external device allowed to transmit the event occurrence notice are disconnected, the notice source determining unit redetermines another external device to be allowed to transmit the event occurrence notice on the basis of the predetermined priorities, and
the notice setting transmission control unit allows the wireless communication unit to transmit the notice setting information item on the redetermination to the external device newly allowed to transmit the event occurrence notice.

10. The event notification device according to claim 3, wherein
if the external device allowed to transmit the event occurrence notice terminates using the online service associated with the event occurrence notice, the notice source determining unit redetermines another external device to be allowed to transmit the event occurrence notice on the basis of the predetermined priorities, and
the notice setting transmission control unit allows the wireless communication unit to transmit the notice setting information on the redetermination to the external device newly allowed to transmit the event occurrence notice.

11. The event notification device according to claim 5, wherein
if the external device capable of transmitting the event occurrence notice becomes incapable of transmitting the event occurrence notice, the list updating unit deletes, from the noticed-event storage unit, the event notice information item on the event occurrence notice disabled to be transmitted.

12. The event notification device according to claim 3, further comprising a priority storage unit which stores the predetermined priorities therein,
wherein the notice setting unit allows one of the external devices to transmit the event occurrence notice on the basis of the predetermined priorities stored in the priority storage unit.

13. An event notification system comprising an event notification device including:
a wireless communication unit which wirelessly transmits and receives predetermined information on an online service using a communication network over a period of maintaining communications with a plurality of external devices which can use the online service via the communication network;
an event occurrence information acquiring unit which acquires an event occurrence notice via the wireless communication unit from each of the external devices maintaining the communications, the notice indicating the occurrence of a predetermined event of the online service being used by the external devices;
an enabled-notice information acquiring unit which acquires an enabled-notice information item on the event occurrence notice via the wireless communication unit, the event occurrence notice being transmittable from each of the external devices maintaining the communications;
a notice setting unit which requests one of the external devices to transmit the event occurrence notice and requests the other external devices not to transmit the event occurrence notice if the enabled-notice information items indicate that the external devices are capable of individually transmitting the same event occurrence notice; and
an event occurrence notification unit which notifies a user of the occurrence of the predetermined event by a predetermined operation on the basis of the event occurrence notice acquired by the event occurrence information acquiring unit from the external device requested by the notice setting unit to transmit the event occurrence notice; and the external devices, wherein
each of the external devices includes:
an event occurrence detection unit which detects and outputs a predetermined event occurred in the online service;
an event occurrence notice unit which wirelessly transmits the event occurrence notice to the event notification device on the basis of the output from the event occurrence detection unit;
an enabled-notice information transmission control unit which wirelessly transmits the enabled-notice information item to the event notification device maintaining the communications; and
a notice control unit which controls the transmission of the event occurrence notice by the event occurrence notice unit on the basis of the allowance requested by the event notification device to transmit the event occurrence notice.

14. The event notification system according to claim 13, wherein if disconnection of communications between the event notification device and one of the external devices occurs, the notice control unit inhibits the transmission of all the event occurrence notices enabled to be transmitted.

* * * * *